(12) United States Patent
Zhang et al.

(10) Patent No.: US 12,420,174 B2
(45) Date of Patent: Sep. 23, 2025

(54) ROTATING DEVICE AND JIGSAW PUZZLE BOARD

(71) Applicant: Meng Zhang, Guangdong (CN)

(72) Inventors: Meng Zhang, Guangdong (CN); Xiaoling Che, Hubei (CN)

(73) Assignee: Meng Zhang, Shenzhen (CN)

( * ) Notice: Subject to any disclaimer, the term of this patent is extended or adjusted under 35 U.S.C. 154(b) by 0 days.

(21) Appl. No.: 18/950,536

(22) Filed: Nov. 18, 2024

(65) Prior Publication Data

US 2025/0073571 A1     Mar. 6, 2025

Related U.S. Application Data

(63) Continuation-in-part of application No. 18/783,453, filed on Jul. 25, 2024, which is a continuation-in-part of application No. 18/748,158, filed on Jun. 20, 2024, application No. 18/950,536 is a continuation-in-part of application No. 18/748,158, filed on Jun. 20, 2024, and a continuation-in-part of application No. 18/736,862, filed on Jun. 7, 2024, said application No. 18/783,453 is a continuation-in-part of application No. 18/736,862, filed on Jun. 7, 2024, and a continuation-in-part of application No. 18/737,905, filed on Jun. 7, 2024, application No. 18/950,536 is a
(Continued)

(30) Foreign Application Priority Data

| Sep. 26, 2021 | (CN) | 202111131554.1 |
| Sep. 26, 2021 | (CN) | 202122334815.1 |
| Jun. 13, 2023 | (CN) | 202330364018.X |
| Feb. 8, 2024 | (CN) | 202420292101.X |
| Apr. 18, 2024 | (CN) | 202430220715.2 |
| Apr. 30, 2024 | (CN) | 202430254326.1 |
| May 23, 2024 | (CN) | 202430309522.4 |
| Jun. 19, 2024 | (CN) | 202430377406.6 |

(51) Int. Cl.
A63F 9/10     (2006.01)

(52) U.S. Cl.
CPC ...... *A63F 9/1044* (2013.01); *A63F 2009/105* (2013.01)

(58) Field of Classification Search
CPC .......... A63F 9/1044; A63F 9/10; A63F 9/072; A63F 9/083; A63F 9/088; A63F 2009/105
USPC ..................................................... 273/153 R
See application file for complete search history.

(56) References Cited

U.S. PATENT DOCUMENTS

| 2,581,417 | A | * | 1/1952 | Wendell | A45C 5/146 |
| | | | | | 190/18 R |
| 4,979,598 | A | * | 12/1990 | Verheij | A45C 5/146 |
| | | | | | 190/122 |

(Continued)

*Primary Examiner* — Nkeisha Smith

(57) ABSTRACT

A rotating device and a jigsaw puzzle table using the rotating device are disclosed in present disclosure. The jigsaw puzzle board includes a board assembly having a body portion and a kickstand coupled with the body portion, and at least one rotating device attached to the kickstand of the board assembly. When the kickstand is in a folded state, at least a part of the rotating device protrudes from a lower surface of the board assembly and contacted with a playing surface. The board assembly is capable of being rotated on the playing place via the rotating device. When the kickstand is in the unfolded state, the body portion and the rotating device are inclined and supported on the playing surface.

23 Claims, 36 Drawing Sheets

Related U.S. Application Data continuation-in-part of application No. 18/734,521, filed on Jun. 5, 2024, and a continuation-in-part of application No. 18/732,602, filed on Jun. 3, 2024, now Pat. No. 12,186,676, said application No. 18/736,862 is a continuation-in-part of application No. 18/541,685, filed on Dec. 15, 2023, now Pat. No. 12,042,740, said application No. 18/737,905 is a continuation-in-part of application No. 18/541,685, filed on Dec. 15, 2023, now Pat. No. 12,042,740, said application No. 18/748,158 is a continuation-in-part of application No. 18/541,685, filed on Dec. 15, 2023, now Pat. No. 12,042,740, said application No. 18/732,602 is a continuation of application No. 18/541,685, filed on Dec. 15, 2023, now Pat. No. 12,042,740, said application No. 18/734,521 is a continuation-in-part of application No. 18/530,402, filed on Dec. 6, 2023, now Pat. No. 12,053,709, said application No. 18/748,158 is a continuation of application No. 18/530,402, filed on Dec. 6, 2023, now Pat. No. 12,053,709, said application No. 18/736,862 is a continuation of application No. 18/235,896, filed on Aug. 21, 2023, now Pat. No. 12,048,885, said application No. 18/737,905 is a continuation of application No. 18/235,896, filed on Aug. 21, 2023, now Pat. No. 12,048,885, said application No. 18/748,158 is a continuation-in-part of application No. 18/235,896, filed on Aug. 21, 2023, now Pat. No. 12,048,885, said application No. 18/734,521 is a continuation of application No. 18/235,896, filed on Aug. 21, 2023, now Pat. No. 12,048,885, said application No. 18/737,905 is a continuation of application No. 18/235,416, filed on Aug. 18, 2023, now Pat. No. 12,059,631, said application No. 18/736,862 is a continuation of application No. 18/235,416, filed on Aug. 18, 2023, now Pat. No. 12,059,631, said application No. 18/734,521 is a continuation-in-part of application No. 18/235,416, filed on Aug. 18, 2023, now Pat. No. 12,059,631, said application No. 18/748,158 is a continuation-in-part of application No. 18/235,416, filed on Aug. 18, 2023, now Pat. No. 12,059,631, and a continuation-in-part of application No. 17/829,359, filed on Jun. 1, 2022, now Pat. No. 12,104,744, said application No. 18/736,862 is a continuation-in-part of application No. 17/829,359, filed on Jun. 1, 2022, now Pat. No. 12,104,744, said application No. 18/734,521 is a continuation-in-part of application No. 17/829,359, filed on Jun. 1, 2022, now Pat. No. 12,104,744, said application No. 18/783,453 is a continuation-in-part of application No. 17/829,359, filed on Jun. 1, 2022, now Pat. No. 12,104,744, said application No. 18/748,158 is a continuation-in-part of application No. 17/829,359, filed on Jun. 1, 2022, now Pat. No. 12,104,744, said application No. 18/235,896 is a continuation-in-part of application No. 17/829,359, filed on Jun. 1, 2022, now Pat. No. 12,104,744, said application No. 18/737,905 is a continuation-in-part of application No. 17/829,359, filed on Jun. 1, 2022, now Pat. No. 12,104,744, said application No. 18/235,896 is a continuation-in-part of application No. 17/505,587, filed on Oct. 19, 2021, now Pat. No. 11,890,551, said application No. 18/541,685 is a continuation-in-part of application No. 17/505,587, filed on Oct. 19, 2021, now Pat. No. 11,890,551, said application No. 18/235,416 is a continuation-in-part of application No. 17/505,587, filed on Oct. 19, 2021, now Pat. No. 11,890,551.

(56) References Cited

U.S. PATENT DOCUMENTS

| | | | | |
|---|---|---|---|---|
| 5,154,265 | A * | 10/1992 | Capistrant | A45C 5/146 16/34 |
| 8,517,411 | B2 * | 8/2013 | Martin | B62B 1/045 280/DIG. 6 |
| 9,861,173 | B2 * | 1/2018 | Lau | H02J 7/1415 |
| 10,172,429 | B1 * | 1/2019 | Smith | A45C 13/10 |
| 11,944,914 | B2 * | 4/2024 | Carr | F16M 11/22 |

* cited by examiner

ROTATING DEVICE AND JIGSAW PUZZLE BOARD

CROSS REFERENCES AND PRIORITIES

This application is a continuation in part of U.S. patent application Ser. No. 18/736,862, a continuation in part of U.S. patent application Ser. No. 18/748,158, a continuation in part of U.S. patent application Ser. No. 18/734,521, and a continuation of U.S. patent application Ser. No. 18/783,453. This application claims priority to Chinese Patent Application 2024303774066 and Chinese Patent Application 2024303095224.

The U.S. patent application Ser. No. 18/736,862 is a continuation of U.S. patent application Ser. No. 18/235,896, a continuation of U.S. patent application Ser. No. 18/235,416, a continuation in part of U.S. patent application Ser. No. 18/541,685, and a continuation in part of U.S. patent application Ser. No. 17/829,359. The U.S. patent application Ser. No. 18/235,416 is a continuation in part U.S. patent application Ser. No. 17/505,587 and a continuation in part of U.S. patent application Ser. No. 17/829,359. The U.S. patent application Ser. No. 18/235,896 is a continuation in part of U.S. patent application Ser. No. 17/505,587 and a continuation in part of U.S. patent application Ser. No. 17/829,359. The U.S. patent application Ser. No. 18/541,685 is a continuation of U.S. patent application Ser. No. 17/505,587. Through U.S. patent application Ser. No. 17/505,587, this application claims priority to Chinese Patent Application No. 2021111315541, filed on Sep. 26, 2021, and Chinese Patent Application No. 2021223348151, also filed on Sep. 26, 2022. Through U.S. patent application Ser. No. 18/235,896, this application claims priority to Chinese Patent Application No. 202330364018X, filed Jun. 13, 2023.

The U.S. patent application Ser. No. 18/748,158 is a continuation in part of U.S. patent application Ser. No. 17/829,359, a continuation in part of U.S. patent application Ser. No. 18/235,416, a continuation in part of U.S. patent application Ser. No. 18/235,896, a continuation of U.S. patent application Ser. No. 18/530,402, and a continuation in part of U.S. patent application Ser. No. 18/541,685. The U.S. patent application Ser. No. 18/530,402 is a continuation in part of U.S. patent application Ser. No. 17/505,587, a continuation in part of U.S. patent application Ser. No. 17/829,359, and a continuation in part of U.S. patent application Ser. No. 18/235,416.

The U.S. patent application Ser. No. 18/734,521 is a continuation in part of U.S. patent application Ser. No. 17/829,359, a continuation in part of U.S. patent application Ser. No. 18/235,416, a continuation of U.S. patent application Ser. No. 18/235,896, and a continuation in part of U.S. patent application Ser. No. 18/530,402. Through U.S. patent application Ser. No. 18/734,521, this application claims priority to Chinese Patent Application 2024302207152, Chinese Patent Application No. 202420292101X, and Chinese Patent Application 2024302543261.

The U.S. patent application Ser. No. 18/783,453 is a continuation in part of U.S. patent application Ser. No. 17/829,359, a continuation in part of U.S. patent application Ser. No. 18/748,158, a continuation in part of U.S. patent application Ser. No. 18/736,862, a continuation in part of U.S. patent application Ser. No. 18/737,905, and a continuation in part of U.S. patent application Ser. No. 18/732,602.

TECHNICAL FIELD

The present invention relates to the field of puzzle game accessories, and in particular to a jigsaw puzzle board with a rotating device, wherein the jigsaw puzzle board is movable with respect to one or more users through the rotating device for allowing the user to move the jigsaw puzzle board for assembling the puzzle pieces thereon at different planar directions, such that the user does not need to physically travel from side to side of the jigsaw puzzle board.

BACKGROUND

The jigsaw puzzle, as a puzzle game, is essential in intellectual development for children. Due to the jigsaw puzzle being interesting, the jigsaw puzzle is also popular among adults. When playing the jigsaw puzzle, a user needs to carefully identify puzzle pieces to find similarities between the puzzle pieces to splice the puzzle pieces together. In order to enable the user to splice the puzzle pieces, the jigsaw puzzle board is released to the market.

When a user challenges a larger scale jigsaw puzzle, it is necessary to prepare a jigsaw puzzle board with sufficient bearing area. However, the arm length of the user is often insufficient to reach the entire game area, and the viewing angle range of the user is not enough to pay attention to the entire game area. As a result, the user often needs to move the position of the puzzle during the game process.

A need exists for a tool that retains all the unfinished pieces and while allowing the user to conveniently user the puzzle. It is to the provision of such a tool that the present invention is primarily directed.

SUMMARY OF THE DISCLOSURE

The invention is advantageous in that it provides a jigsaw puzzle board with a rotating device for allowing a user to conveniently play a plurality of puzzle pieces.

The present invention provides a rotating device for moving on a playing surface, which includes a case having a receiving space and an opening formed on the case and communicated with the receiving space, a first roller received in the receiving space, and a second roller completely received in the receiving space and in contact with the first roller to rotate together with the first roller. When the first roller and the second roller rotate, at least a part of the first roller passes through the opening to make contact with the playing surface. The second roller is blocked by the first roller in the receiving space for preventing the second roller from leaking out of the opening.

Optionally, a radius of the first roller is greater than a radius of the second roller.

Optionally, the case comprises an engaging wall and a side wall extending from the engaging wall; the second roller abuts against both the engaging wall and the side wall; the first roller is spaced apart from the engaging wall.

Optionally, the number of second rollers is greater than two, and they are arranged around the first roller.

Optionally, the case comprises a main portion, a fixing portion extending from the main portion and a dome covering on the main portion and connected to the fixing portion; the engaging wall is formed on the main portion; the opening passes through the dome.

Optionally, an inner surface of the engaging wall engaged with the second roller is substantially flat.

Optionally, the fixing portion comprises a through-hole, and the case comprises a hook extending from the dome; the hook passes through the through-hole and is engaged with the fixing portion.

Optionally, the case further comprises a surrounding wall extending from the dome towards the side wall to form the receiving space together with the main portion.

In another aspect, the present disclosure provides a jigsaw puzzle board supported on a playing surface for assembling a plurality of puzzle pieces, which includes a board assembly and at least one rotating device attached to the board assembly. The board assembly includes a body portion having a puzzle plate for assembling the puzzle pieces and an extending edge extending from the puzzle plate, and a kickstand coupled with the body portion and configured to be in either a folded state or an unfolded state relative to the body portion. The rotating device is attached to the kickstand of the board assembly. The extending edge and the kickstand are located on opposite sides of the puzzle plate. When the kickstand is in the folded state, the board assembly includes a lower surface that is distant from the puzzle plate, and at least a part of the rotating device protrudes from the lower surface and contacted with the playing surface. The board assembly is capable of being rotated on the playing place via the rotating device. When the kickstand is in the unfolded state, the body portion and the rotating device are inclined and supported on the playing surface, and the rotating device is in a non-working state.

Optionally, the rotating device comprises a first roller; when the kickstand is in the folded state, at least a part of the first roller protrudes from the lower surface and directly contacted with the playing surface.

Optionally, when the kickstand is unfolded, a bottom of the rotating device near the playing surface is spaced apart from the playing surface.

Optionally, the body portion comprises a longer wall extending along a longitudinal direction; when the kickstand is unfolded, the kickstand cooperates with the longer wall for supporting the body portion on the playing surface.

Optionally, the rotating device further comprises a case comprising a receiving space, an opening formed on the case and communicated with the receiving space, and a second roller completely received in the receiving space; the first roller consists of an inner part received within the receiving space and an outer part that passes through the opening to make contact with the playing surface; the second roller is in contact with the inner part of the first roller.

Optionally, the case comprises a main portion, a fixing portion extending from the main portion, and a dome covering on the main portion and connected to the fixing portion.

Optionally, the body portion comprises a contacting portion; the case comprises a connecting surface mounted on the contacting portion, and both the contacting portion and the connecting surface are substantially flat.

Optionally, the number of second rollers is more than two, and they are arranged around the first roller.

Optionally, a radius of the first roller is greater than a radius of the second roller.

In a third aspect, the present disclosure provides a jigsaw puzzle board for placing on a playing place, which includes a board assembly and least three rotating devices attached to the board assembly. The board assembly includes a body portion having a puzzle plate for assembling the puzzle pieces and an extending edge extending from the puzzle plate, and a kickstand for supporting the body portion on the playing surface. The three rotating devices is attached to the body portion and spaced apart from the kickstand. The extending edge and the kickstand are located on opposite sides of the puzzle plate. When the kickstand is in a non-working state, the body portion comprises a lower surface that is distant from the puzzle plate, and at least a part of each rotating device protrudes from the lower surface and contacted with the playing surface, and the board assembly is capable of being rotated on the playing place via the rotating devices. When the kickstand supports the body portion, the body portion and the rotating devices are inclined and supported on the playing surface, and all the rotating devices are in a non-working state.

Optionally, when the kickstand is in a folded state, a plane in which the puzzle plate is located is defined as a projection plane, a projection of the kickstand on the projection plane and projections of the rotating devices on the projection plane do not overlap.

Optionally, when the kickstand is in the folded state, an outer edge of the kickstand forms a folded area; the rotating devices surround the kickstand and are located outside the folded area.

Optionally, the body portion comprises a reinforcing member connected to a lower surface of the puzzle plate, at least one of the rotating devices is attached to the reinforcing member and spaced apart from the puzzle plate.

Optionally, the body portion comprises a supporting frame support an outer peripheral edge of the puzzle plate; at least one of the rotating devices is attached to the supporting frame and spaced apart from the puzzle plate.

Optionally, the rotating device comprises at least one first roller contacted with the playing surface; when the kickstand is in the folded state, at least a part of the first roller protrudes from the lower surface and contacted with the playing surface.

Optionally, the rotating device further comprises a case comprising a receiving space, an opening formed on the case and communicated with the receiving space, and a second roller completely received in the receiving space; the first roller consists of an inner part received within the receiving space and an outer part that passes through the opening to make contact with the playing surface; the second roller is in contact with the inner part of the first roller.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION

Figure 1:
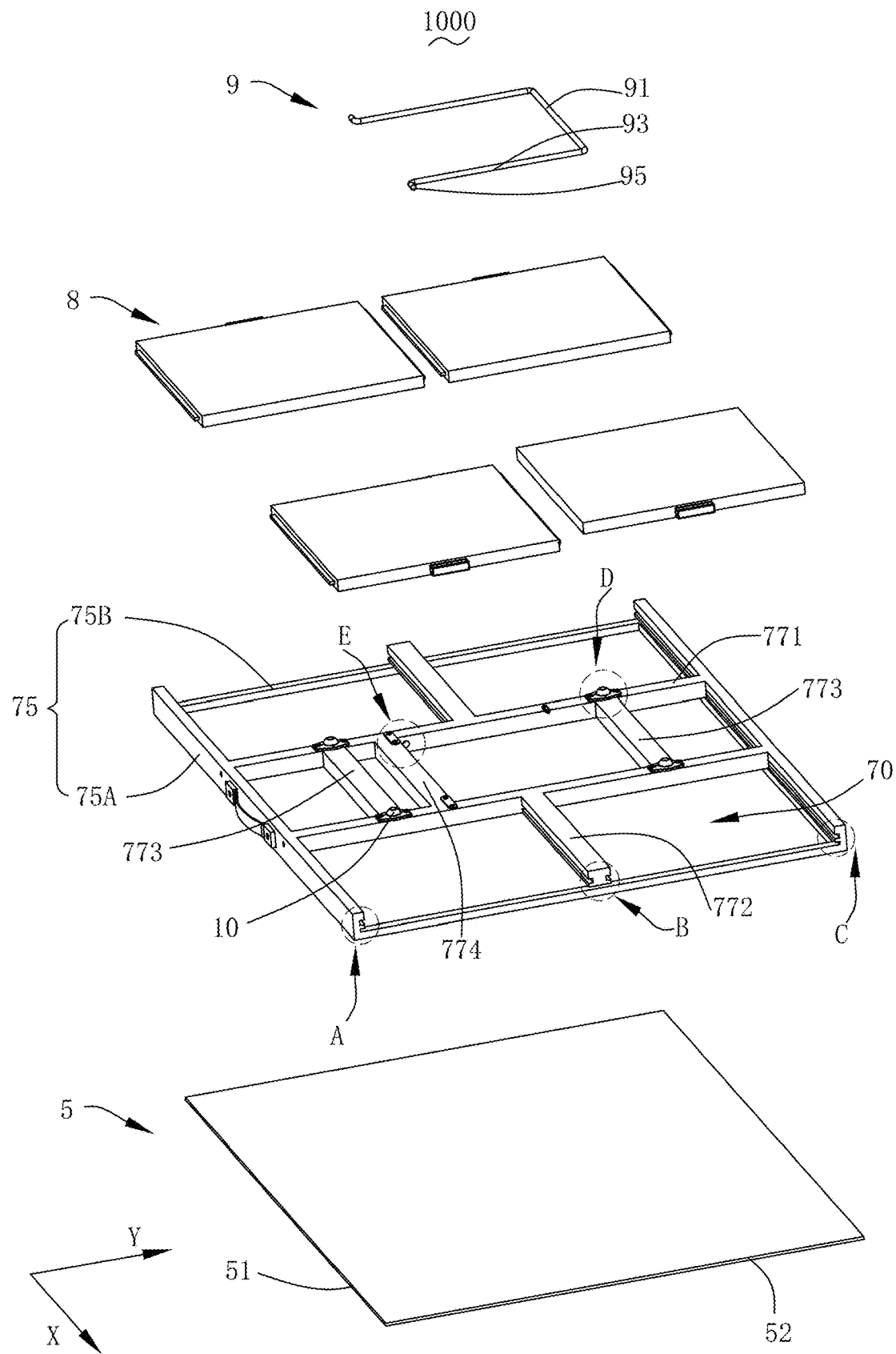
FIG. 1 is an exploded perspective view of a jigsaw puzzle board according to a first embodiment of the present invention.
Figure 2:
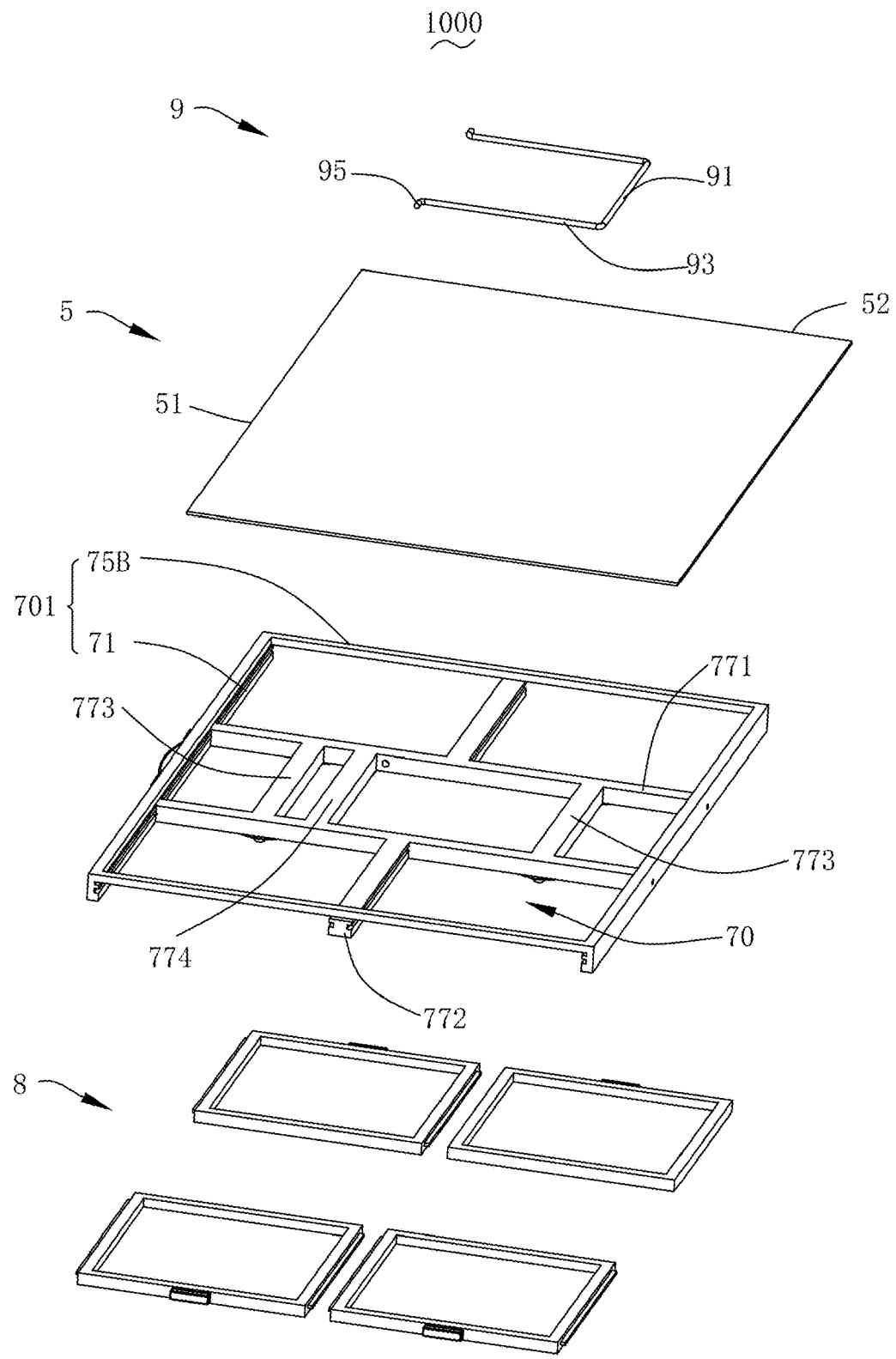
FIG. 2 is an exploded perspective view of the jigsaw puzzle board shown in FIG. 1, viewed from a different angle.
Figure 3:
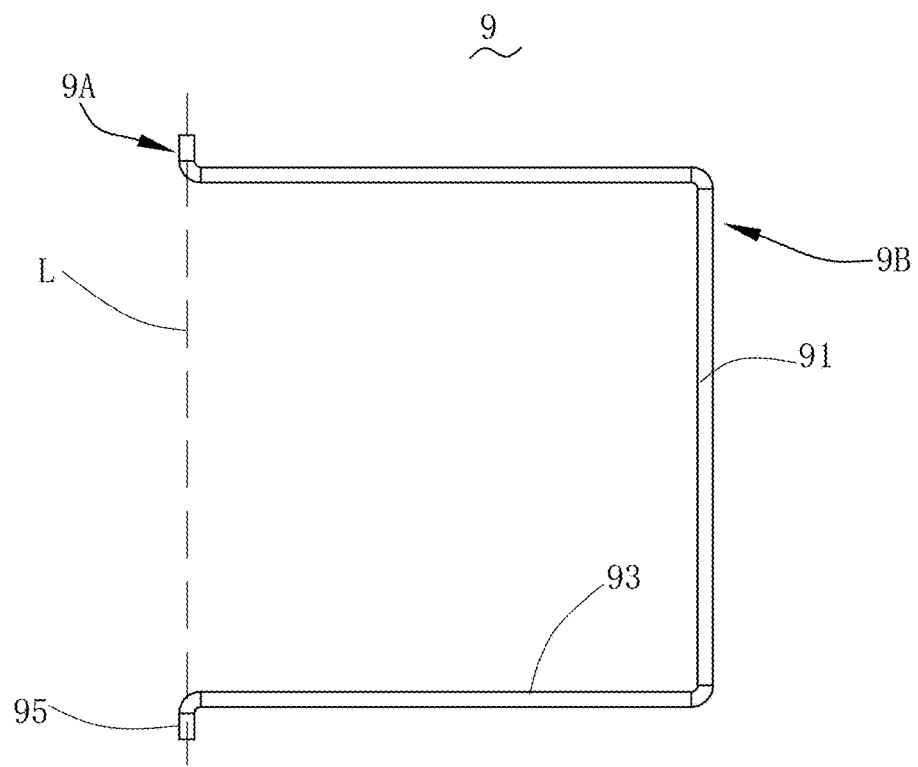
FIG. 3 is an illustrative isometric view of a kickstand of the jigsaw puzzle board shown in FIG. 1.
Figure 4:
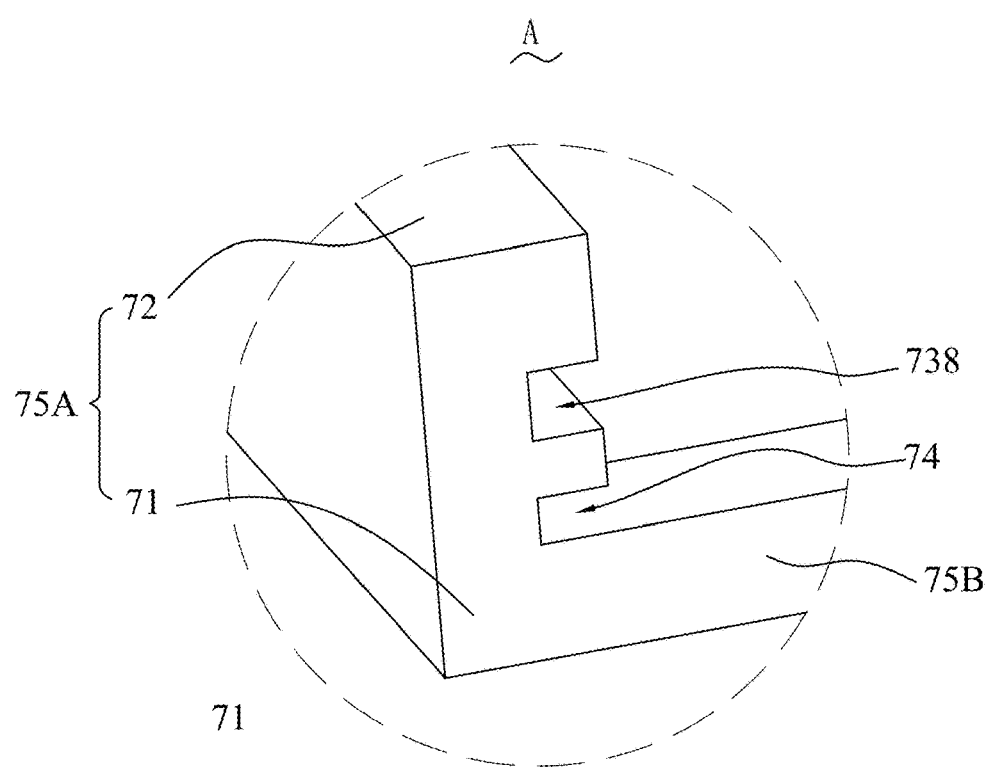
FIG. 4 is an enlarged view of Part A in FIG. 1.
Figure 5:
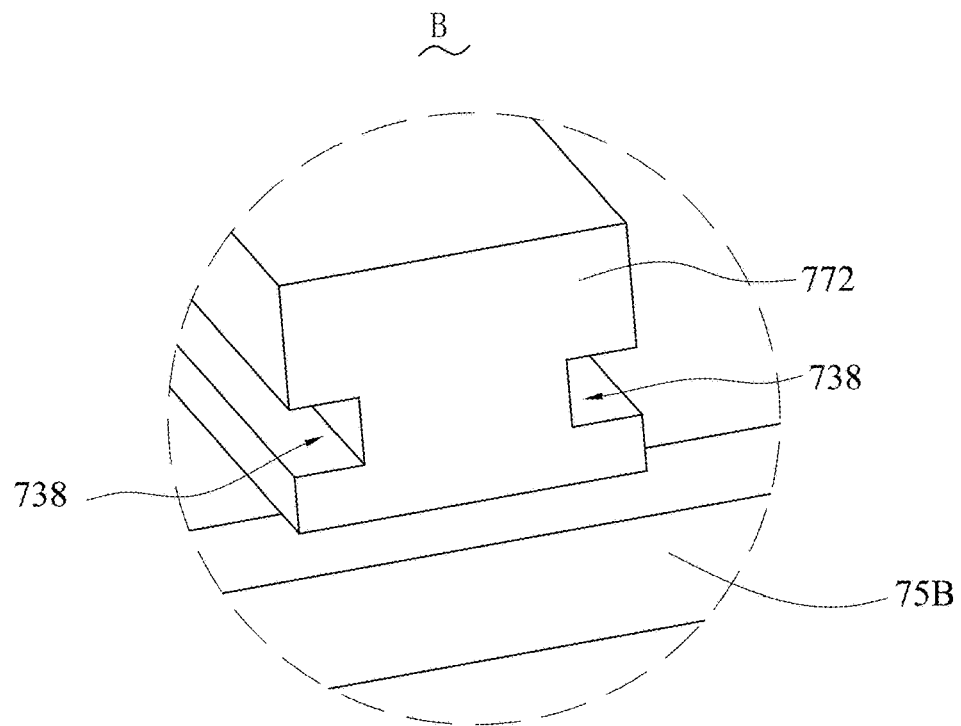
FIG. 5 is an enlarged view of Part B in FIG. 1.
Figure 6:
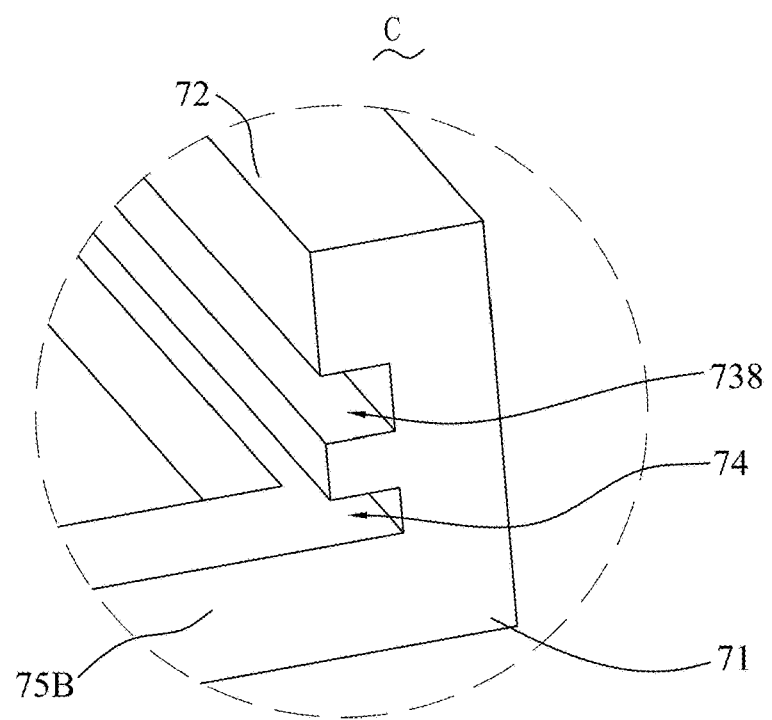
FIG. 6 is an enlarged view of Part C in FIG. 1.
Figure 7:
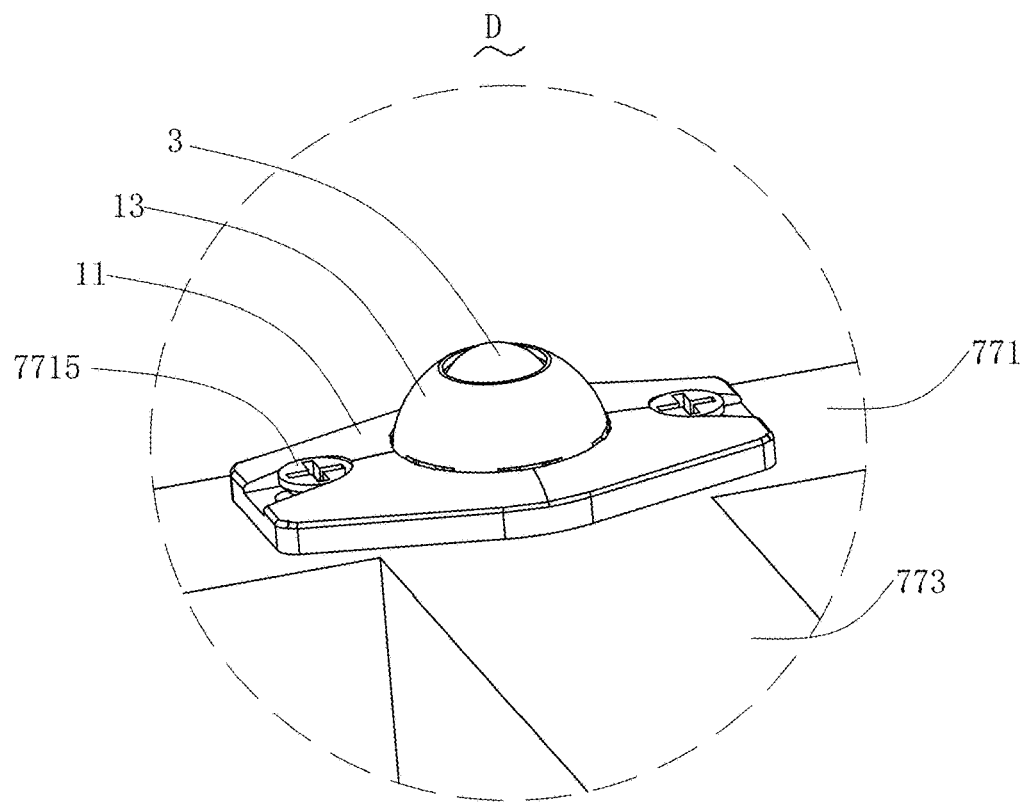
FIG. 7 is an enlarged view of Part D in FIG. 1.
Figure 8:
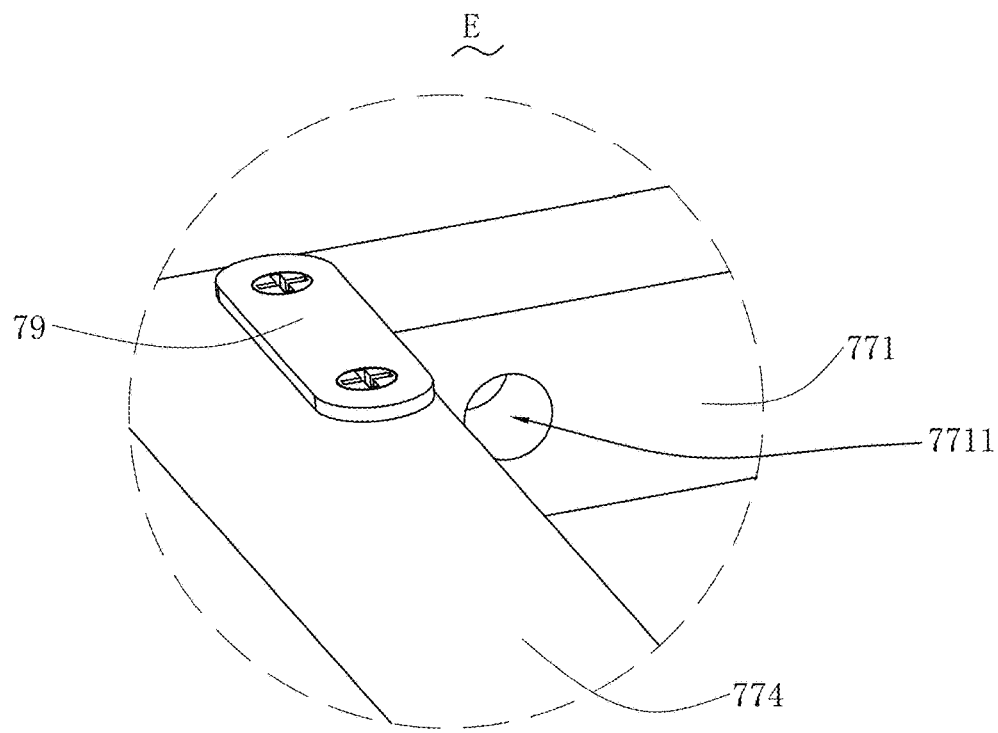
FIG. 8 is an enlarged view of Part E in FIG. 1.
Figure 9:
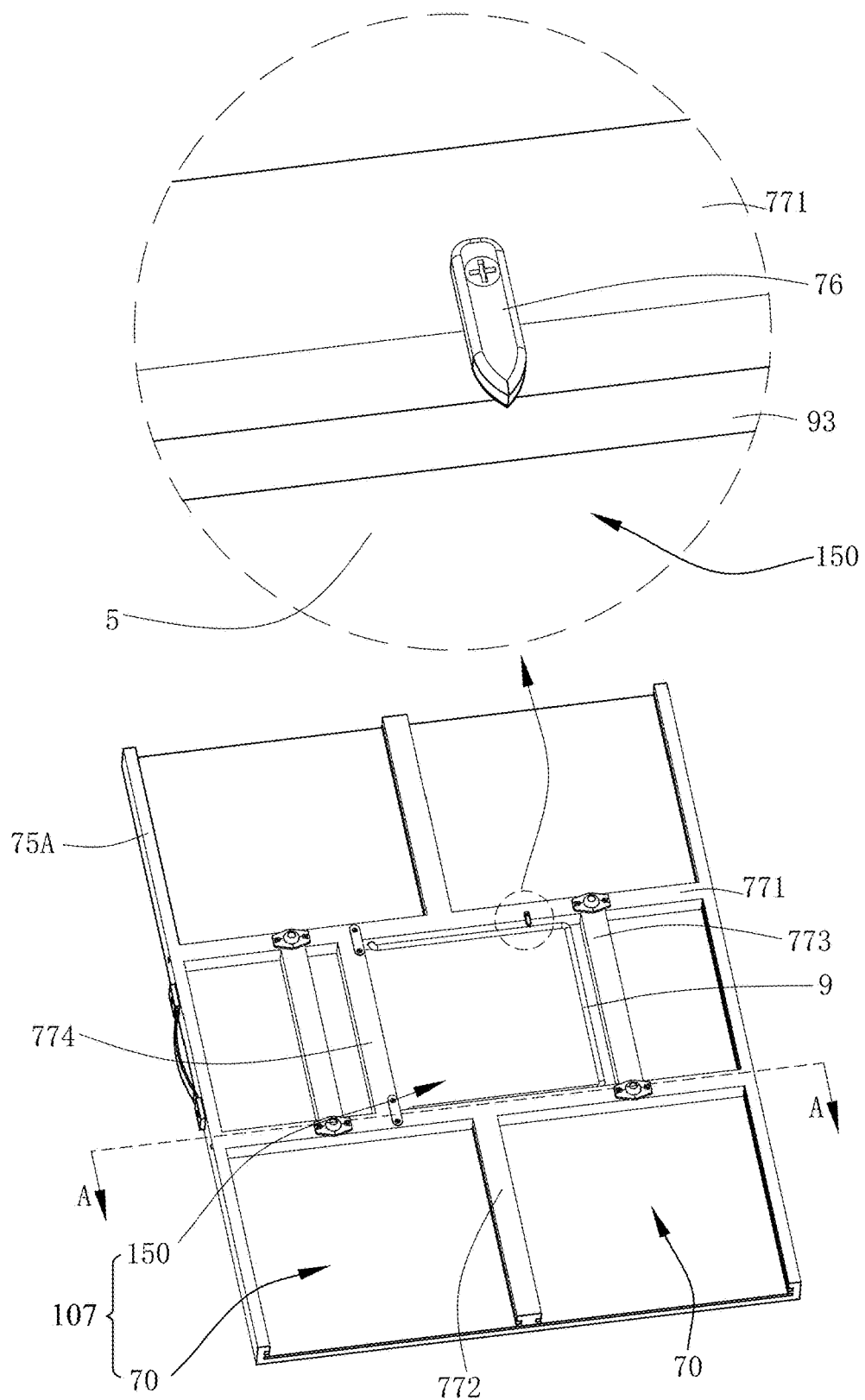
FIG. 9 is an illustrative isometric view of the jigsaw puzzle board shown in FIG. 1, omitting puzzle drawers.
Figure 10:
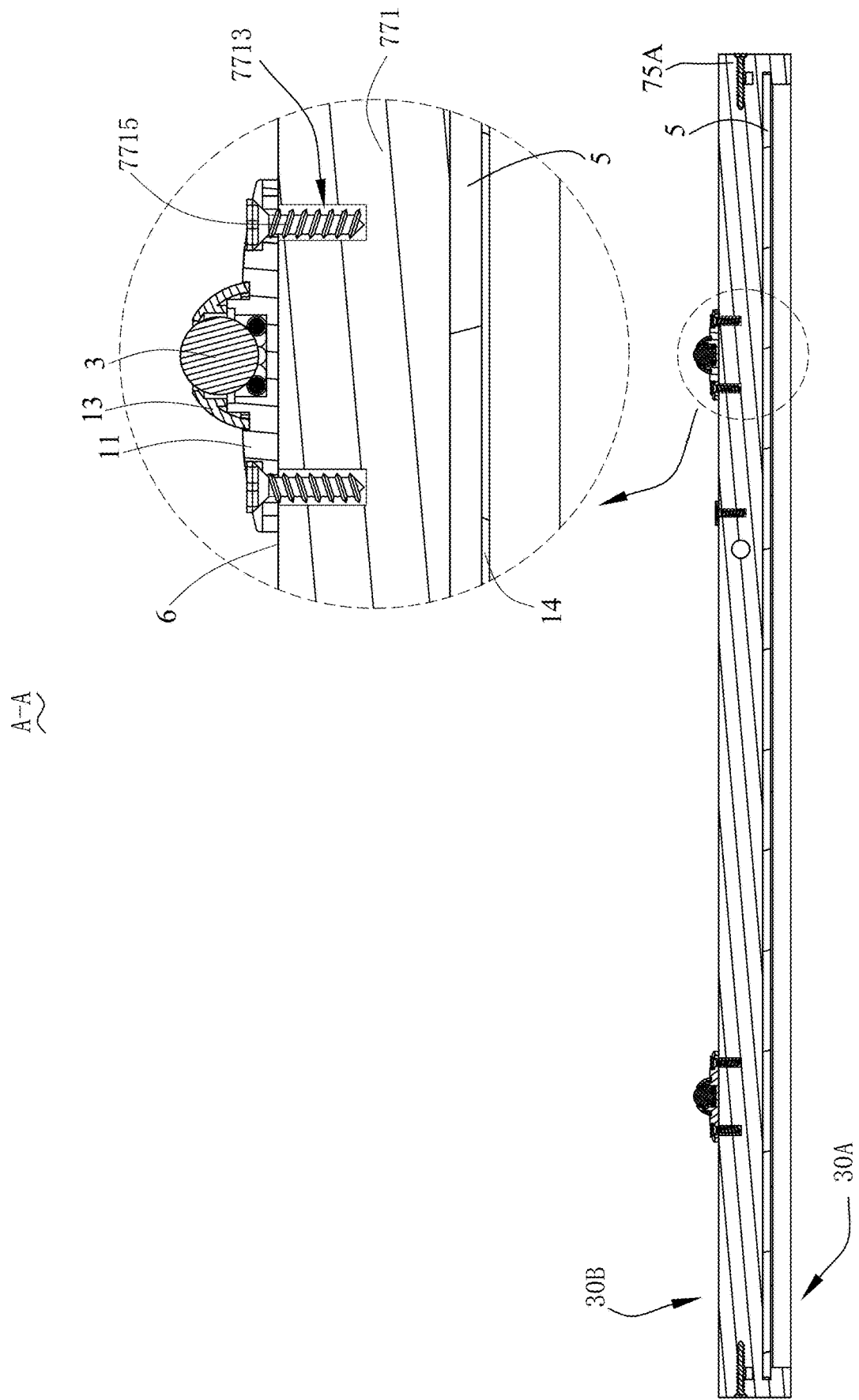
FIG. 10 is an illustrative cross-sectional view of the jigsaw puzzle board taken along line A-A of FIG. 9.

In order to facilitate understanding of the present invention, the present invention will be fully described below by referring to the accompanying drawings. The accompanying drawings show preferred embodiments of the present invention. However, the present invention may be realized in various forms, which are not limited to the embodiments described herein. The embodiments are provided to enable the present invention to be understood more thoroughly and comprehensively.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element may be one and in other embodiment the number of the element may be greater than one. The term "a" is not construed as a limitation of quantity.

In the description of the present invention, it should be noted that the terms "mounted," "connected," and "linked" should be understood in a general manner, which could be, for example, affixedly connected, detachably connected, or integrally connected. Unless expressly specified and defined otherwise, it may also be a mechanical connection, an electrical connection or may be in communication with each other; it may be directly connected or indirectly connected by means of an intermediate medium, and may be an interaction relationship between two or more elements inside the two elements. For a person of ordinary skill in the art, the specific meanings of the above terms in the present invention may be understood according to specific situations.

It should be noted that when an element is "fixed" to another element, it means that the element is directly arranged on the element, or an intermediate element is arranged therebetween. When an element is "connected" to another element, it means that the element is directly connected to the element, or an intermediate element is arranged therebetween. Furthermore, the term "and/or" is merely a description of an associative relationship between associated objects and indicates that three relationships may exist. For example, A and/or B means that A exists alone, both A and B exist, and B exists alone.

Unless otherwise defined, all technical and scientific terms used herein have the same meaning as commonly understood by any ordinary skilled person in the art. Terms in the specification of the present invention are used only for the illustrative purposes only. For example, "in," "out," "left," "right," and similar expressions are used for illustrative purposes only, and are not intended to limit the present invention.

As shown in FIGS. 1 to 32, schematic views of the jigsaw puzzle board 1000 from a first embodiment of the present invention are presented. The jigsaw puzzle board 1000 is designed for a user or player to assemble a plurality of puzzle pieces 100 thereon. Accordingly, the jigsaw puzzle board 1000 comprises a board assembly 30, at least one rotating device 10 located below the board assembly 30 and connected to the board assembly 30. The board assembly 30 comprises a body portion 4 and a kickstand 9 hinged to the body portion 4. The jigsaw puzzle board 1000 may be placed on any playing surface 20, such as a table, wall, floor, or similar structure. The rotating device 10 supports the board assembly 30 relative to the playing surface 20 for driving the board assembly 30 to rotate and move in any direction, thereby changing positions of the board assembly 30 relative to the user. The kickstand 9 is coupled with the body portion 4 and configured to be in either a folded state or an unfolded state relative to the body portion 4.

As shown in FIGS. 1-13, the body portion 4 has an upper side 30A and a lower side 30B opposite to the upper side 30A. The body portion 4 comprises a puzzle plate 5, at least one puzzle drawer 8 disposed under the puzzle plate 5, and a supporting frame 75 supporting the puzzle plate 5. The supporting frame 75 comprises two longer walls 75A extending along a longitudinal direction X and two shorter walls 75B extending along a lateral direction Y. The longitudinal direction X is perpendicular to the lateral direction Y. Each longer wall 75A comprises an upper edge 71 extending from the puzzle plate 5 and a lower edge 72 extending from the upper edge 71 and located below the puzzle plate 5. The puzzle plate 5 is a rectangular planar structure that comprises two longer edges 51 extending along the longitudinal direction X and two shorter edges 52 extending along the lateral direction Y. The two longer walls 75A support the longer edges 51 of the puzzle plate 5. The two shorter walls 75B support the shorter edges 52 of the puzzle plate 5. The upper edge 71 and the kickstand 9 are located on opposite sides of the puzzle plate 5.

Each longer wall 75A comprises a fixing slot 74 that extends linearly from one end of the longer wall 75A to the other. The puzzle plate 5 may be inserted from either end of the fixing slot 74, with its edges constrained within the fixing slot 74. The fixing slot 74 restricts the lateral and thickness movement of the puzzle plate 5, allowing its motion to occur only along the extension direction of the fixing slot 74. Therefore, there is no need for additional fixing structures between the puzzle plate 5 and the supporting frame 75, while still maintaining a detachable connection between them. This allows the puzzle plate 5 and the supporting frame 75 to be packaged separately for transportation, addressing the potential issue of damage during transport when the puzzle plate 5 is assembled onto the supporting frame 75.

The upper edges 71 cooperated with two shorter walls 75B form an extending edge 701 for preventing the puzzle pieces 100 from falling off the upper side 30A of the body portion 4 when the board assembly 30 is rotated on the playing surface 20 via a rotation movement of the rotating device 10 and/or when the jigsaw puzzle board 1000 is moved by the user or player from one place to another. The extending edge 701 may be either a fully enclosed structure or a semi-enclosed structure. In this embodiment, the extending edge 701 and the puzzle plate 5 are enclosed together to form the first chamber 105 on the upper side 30A. The lower edge 72 and the puzzle plate 5 are connected to form the second chamber 107 on the lower side 30B. The extending edge 701 are generally of a one-piece type to embed the outer peripheral edge of the puzzle plate 5. In an alternative embodiment, the extending edge 701, and each upper edge 71, two shorter walls 75B may be formed by splicing a plurality of strips. The upper edge 71 and two shorter walls 75B may connected with each other and stack on the upper surface of the puzzle plate 5. The outer peripheral edge of the puzzle plate 5 is exposed from the extending edge 701. Optionally, the upper edge 71 or/and two shorter walls 75B can be omitted. The lower edge 72 and the puzzle plate 5 may be arranged to form only the second chamber 107 that opens on the lower side 30B.

The body portion 4 further comprises a reinforcing member 77 located within the second chamber 107. The reinforcing member 77 is respectively connected to the lower edge 72 and the puzzle plate 5, thereby providing support for the puzzle plate 5. Optionally, the reinforcing member 77 may be solely connected to the lower edge 72, or the reinforcing member 77 may be solely connected to the puzzle plate 5. The reinforcing member 77 comprises a pair of first reinforcing ribs 771 and a pair of second reinforcing ribs 772 for forming a plurality of drawer cavities 70 together with the lower edge 72 to receive the puzzle drawers 8. Specifically, two longer walls 75A and the pair of second reinforcing ribs 772 are also comprises drawer slots 738 that extends along the longitudinal direction X and allows for the movement of the puzzle drawers 8. The drawer slots 1238 are positioned below the fixing slot 74.

Figure 27:
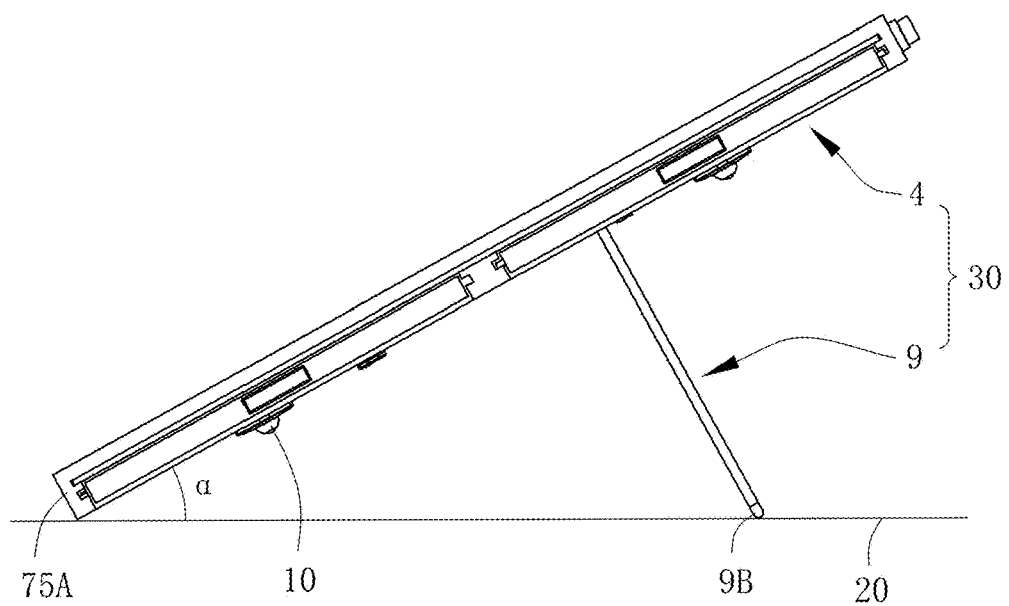
FIG. 27 is an illustrative isometric view of the jigsaw puzzle board placed on a playing surface, showing the kickstand in the unfolded state.
Figure 28:
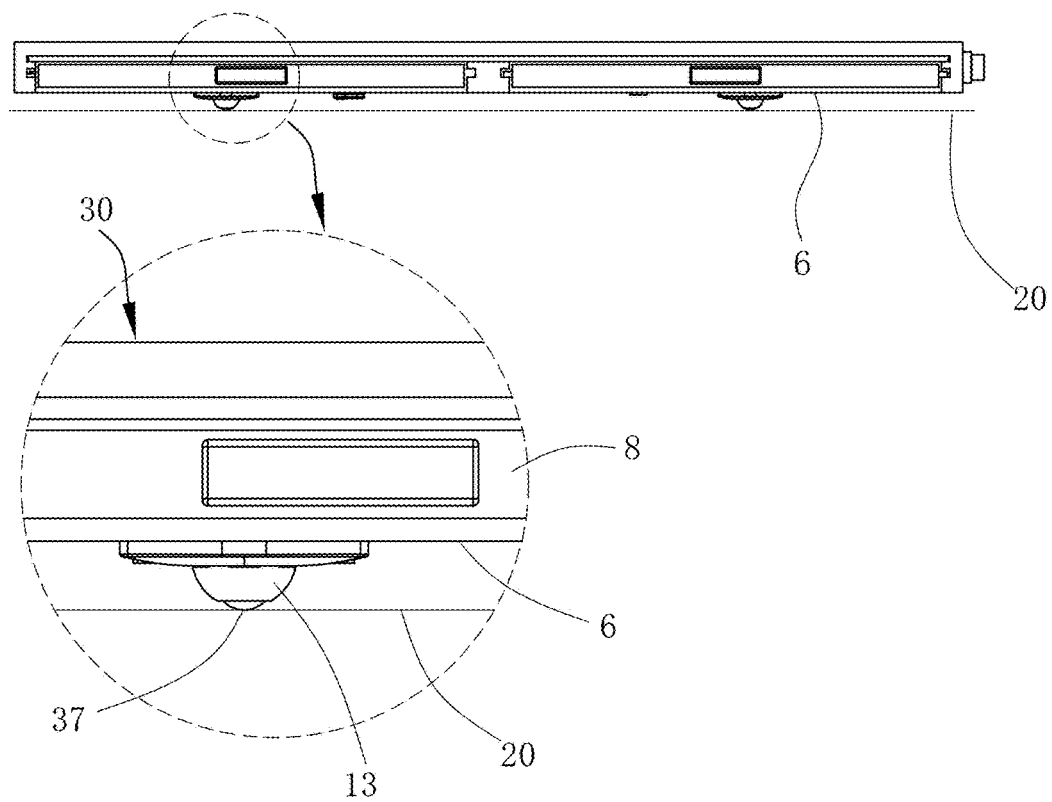
FIG. 28 is an illustrative isometric view of the jigsaw puzzle board placed on a playing surface, showing the kickstand in a folded state.

The pair of first reinforcing ribs 771 are spaced apart along the longitudinal direction X to form a receiving chamber 150. The reinforcing member 77 further comprises a pair of third reinforcing ribs 773 received in the receiving chamber 150 and a stopping rib 774 received in the receiving chamber 150. The third reinforcing ribs 773 and the stopping rib 774 are spaced apart along the lateral direction Y respectively. The two ends of each third reinforcing rib 773 connect with the first reinforcing ribs 771 and fit into the receiving chamber 150. The stopping rib 774 is located between the pair of third reinforcing ribs 773 and is spaced apart from the pair of third reinforcing ribs 773. When the kickstand 9 is in the unfolded state, the kickstand 9 abuts against the stopping rib 774. Thus, the body portion 4 limits the kickstand 9 in the unfolded state. The kickstand 9 cooperates with one of the longer walls 75A to support the body portion 4 on the playing surface 20. That is, the free end 9B and one of the longer walls 75A are mounted on the playing surface 20. It should be noted that when the body portion 4 is inclined and supported on the playing surface 20 by the kickstand 9, the rotating device 10 may either be spaced apart from or in contact with the playing surface 20. In this embodiment, a bottom of the rotating device 10 near the playing surface 20 is spaced apart from the playing surface 20, as depicted in FIG. 27.

Each the first reinforcing rib 771 extends at both ends along the lateral direction Y to connect with the corresponding lower edge 72. Each the second reinforcing rib 772 extends at both ends along the longitudinal direction X and is interlaced with the corresponding first reinforcing rib 771. It can be understood that in other embodiments, the second reinforcing ribs 772 can be omitted. In this embodiment, the number of the first reinforcing ribs is two. Optionally, the number of first reinforcing ribs and second reinforcing ribs may differ. It should be noted that the number of reinforcing ribs is not limited to one or two. The puzzle plate 5, the supporting frame 75, and the reinforcing member 77 are made of plastic, wood, or metal, with wood being the preferred material.

As shown in FIGS. 1-2, 9-13, and 27-28, the body portion 4 has a rectangular shape. The longitudinal direction X is the length direction of the body portion 4, and the lateral direction Y is the width direction of the body portion 4. It can be understood that in other embodiments, the body portion 4 could take forms such as cylindrical, circular, or square. The puzzle drawers 8 are located between the second reinforcing ribs 772 and the lower edge 72. The puzzle drawers 8 can be used to store puzzle pieces, thereby preventing the loss of the puzzle pieces 100.

The kickstand 9 is pivotally connected to the body portion 4, and comprises a rotating end 9A coupled with the body portion 4 and a free end 9B located far from the rotating end 9A. When the kickstand 9 is in the unfolded state, the kickstand 9 supports the body portion 4. Both the body portion 4 and the free end 9B of the kickstand 9 are directly placed on the playing surface 20. With the support of the kickstand 9, the body portion 4 is inclined and supported on the playing surface 20. The puzzle plate 5 and the puzzle drawers 8 are respectively inclined relative to the playing surface 20. Each rotating device 10 is also inclined relative to the playing surface 20 when in a non-working state. At least a part of the body portion 4 extending along the longitudinal direction X is supported on the playing surface 20 for cooperating with the kickstand 9 to support the body portion 4 on the playing surface 20.

For convenient operation, each the puzzle drawer 8 is pulled out along the lateral direction Y. When the puzzle drawers 8 are being pulled out, distances between each puzzle drawer 8 and the playing surface 20 remain unchanged. Since the puzzle drawers 8 are pulled out from the lateral direction Y, the inclination of the body portion 4 does not affect the pulling operation of the puzzle drawers 8. By reasonably setting the pulling direction of the puzzle drawers 8 and the inclination method of the body portion 4, the convenience of the player's operation is improved.

It should be noted that the term "the folded state" means that the kickstand 9 is parallel or substantially parallel to the puzzle plate 5 of the body portion 4. The term "the unfolded state" means that the free end 9B of the kickstand 9 is placed and supported on the playing surface 20. An angle between the playing surface 20 and the kickstand 9 is denoted as α. Preferably, the range is 90°>α>0°.

As shown in FIGS. 1-3, 9-11, and 28, the kickstand 9 is pivotally folded on the body portion 4 at the lower side 30B so that the kickstand 9 in the folded state is accommodated within the receiving chamber 150. In this embodiment, the jigsaw puzzle board 1000 has a rotating connection member 95. The kickstand 9 is pivotally connected to the first reinforcing ribs 771 of the body portion 4 through the rotating connection member 95. In this embodiment, the rotating connection member 95 is designed for free rotation along a rotating axis L, allowing the kickstand 9 to be freely rotated between the folded state and the unfolded state.

Figure 29:
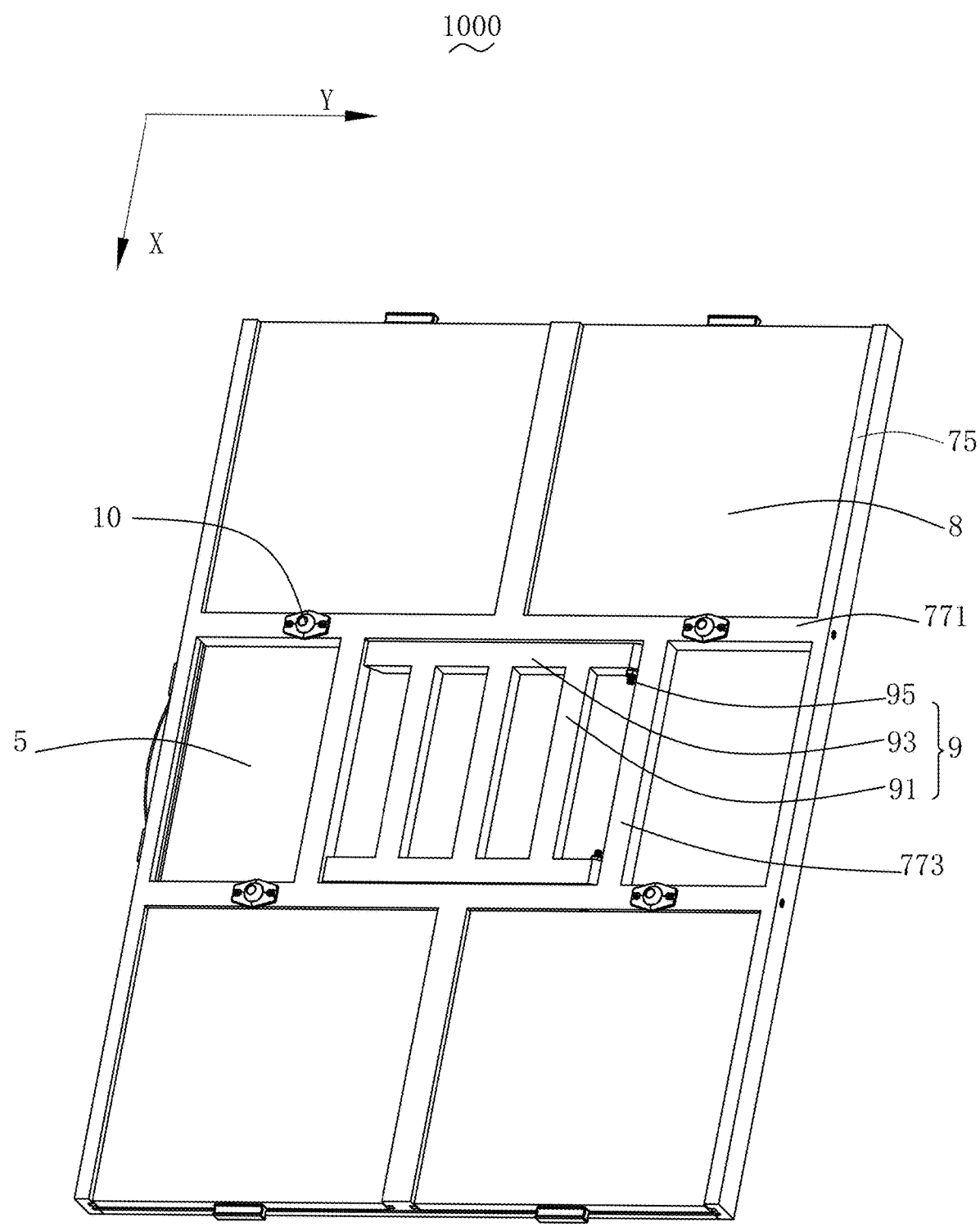
FIG. 29 illustrates an alternative mode of a board assembly of the jigsaw puzzle board shown in FIG. 1.
Figure 30:
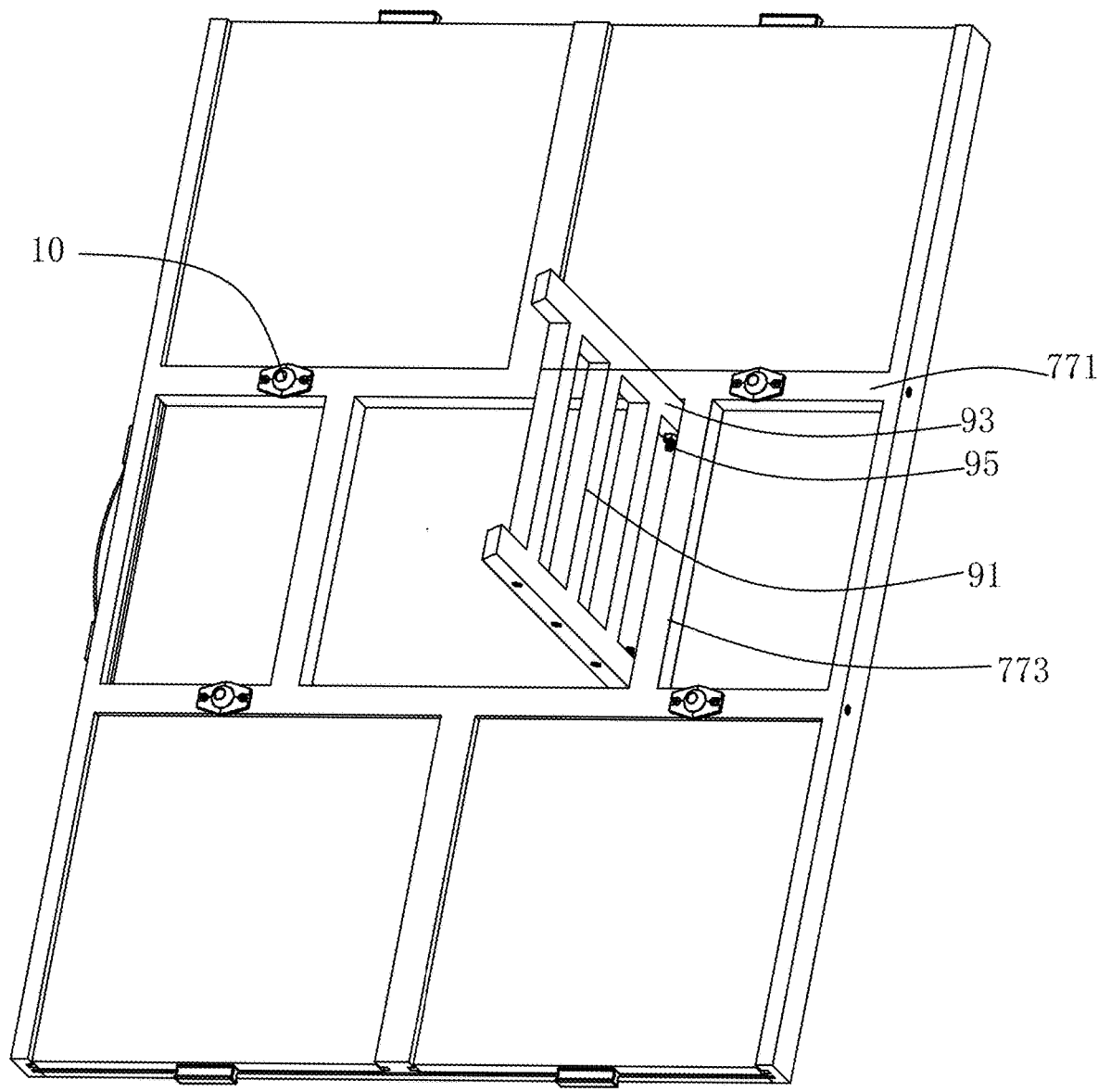
FIG. 30 is an illustrative isometric view of the jigsaw puzzle board shown in FIG. 29, showing the kickstand in the unfolded state.
Figure 31:
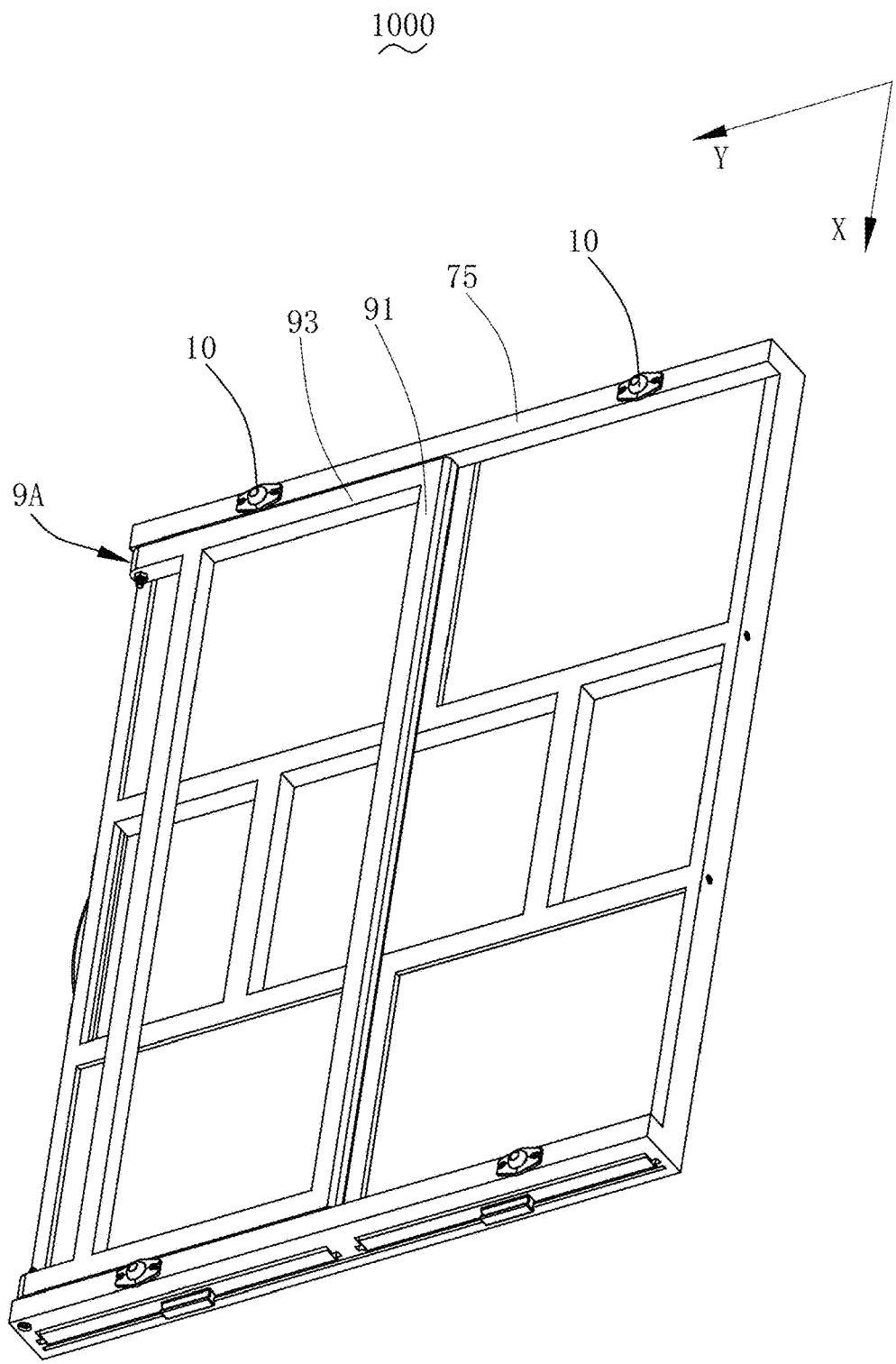
FIG. 31 illustrates a third mode of a board assembly of the jigsaw puzzle board shown in FIG. 1.
Figure 32:
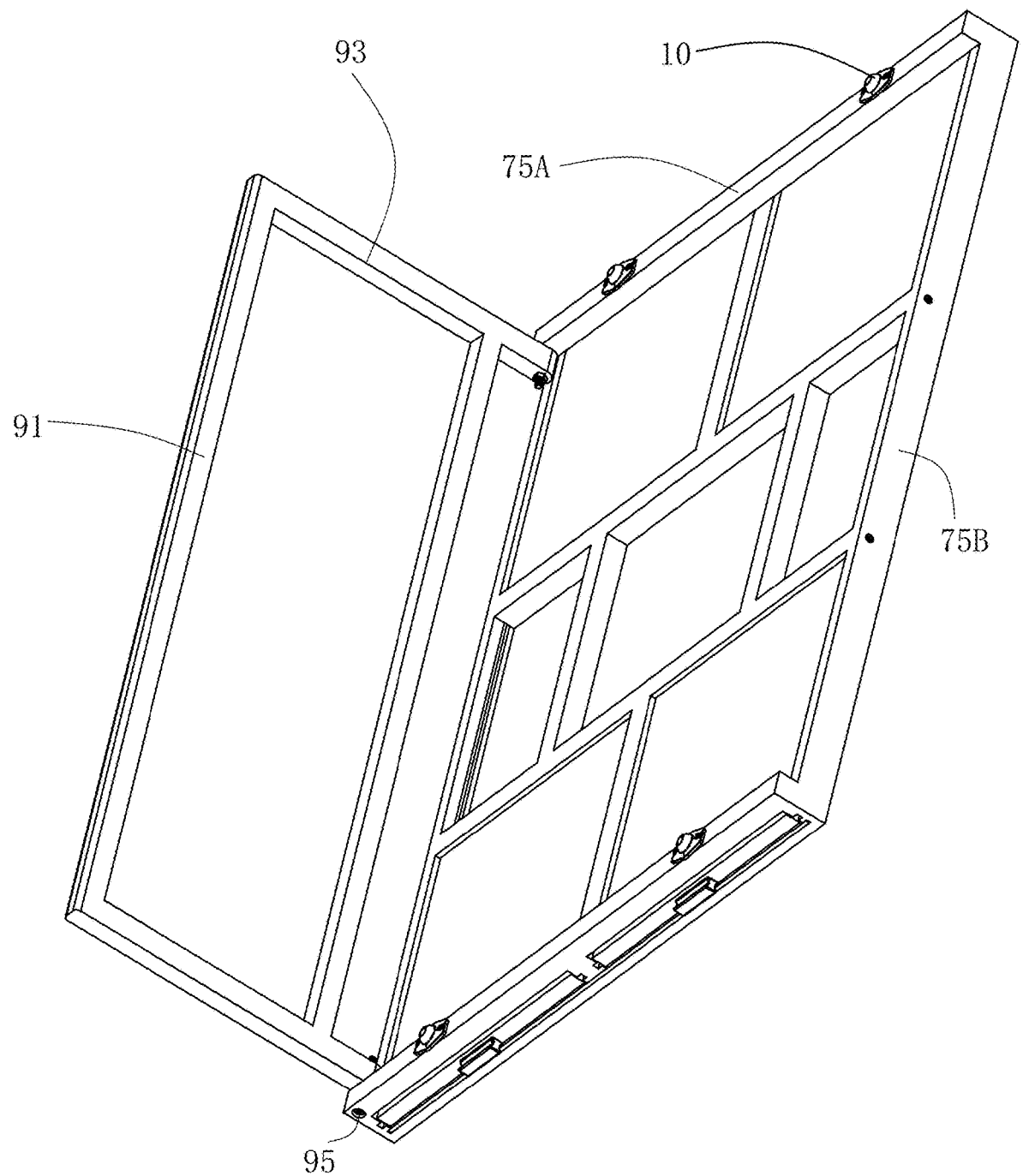
FIG. 32 is an illustrative isometric view of the jigsaw puzzle board shown in FIG. 31, showing the kickstand in the unfolded state.
Figure 33:
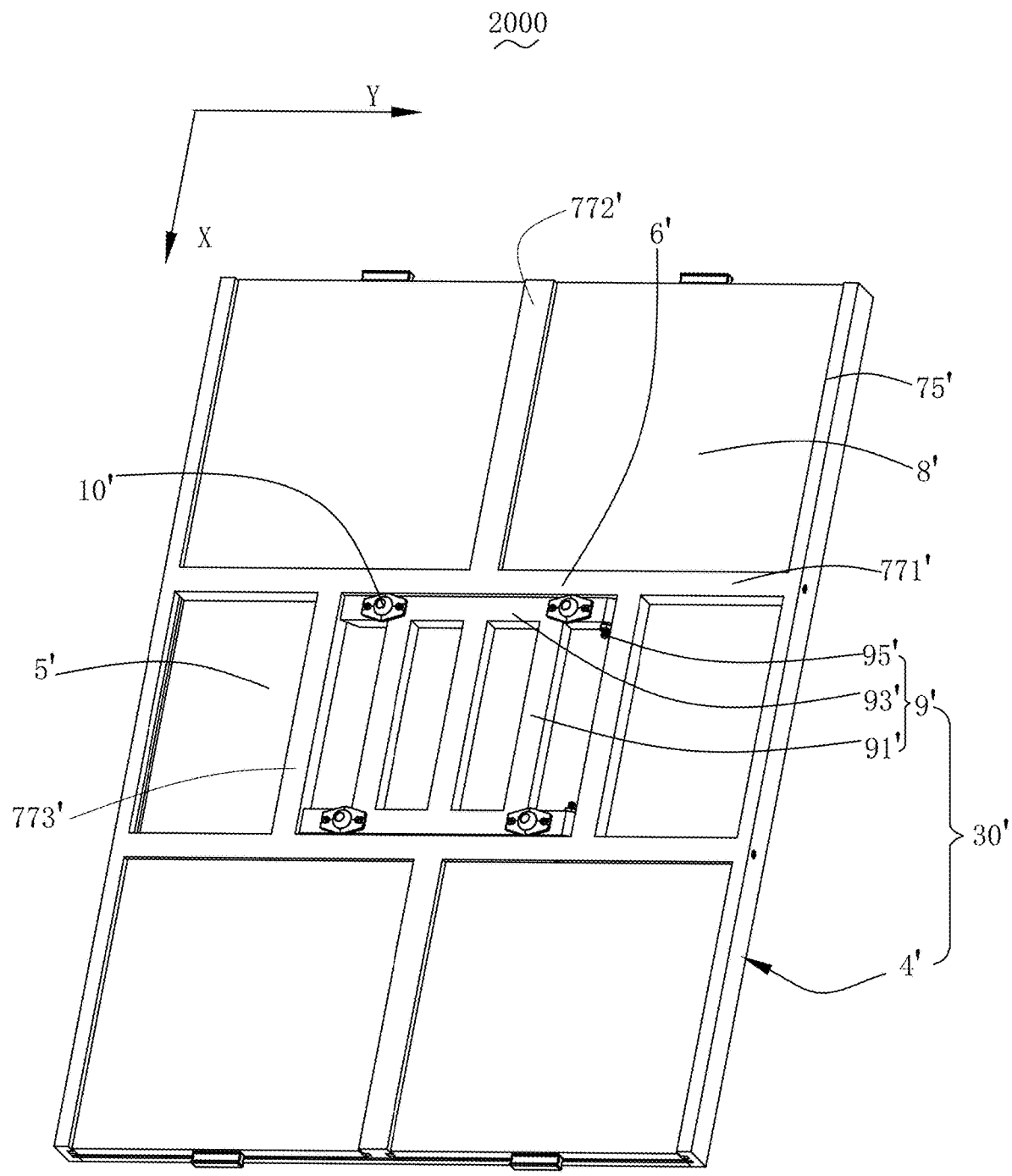
FIG. 33 is an illustrative isometric view of a jigsaw puzzle board according to a second embodiment of the present invention.
Figure 34:
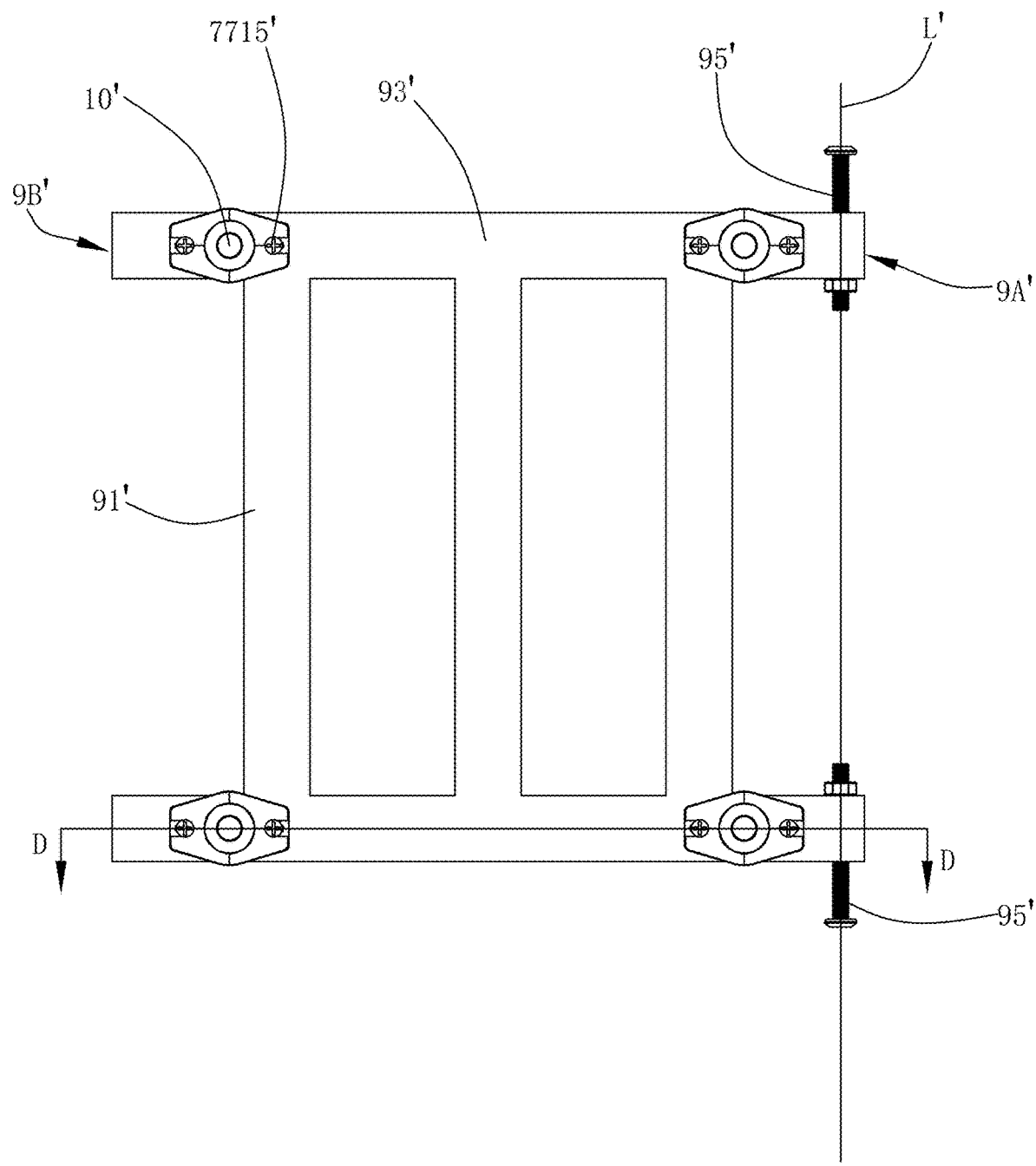
FIG. 34 is an illustrative isometric view of a kickstand and rotating devices of the jigsaw puzzle board shown in FIG. 33.
Figure 35:
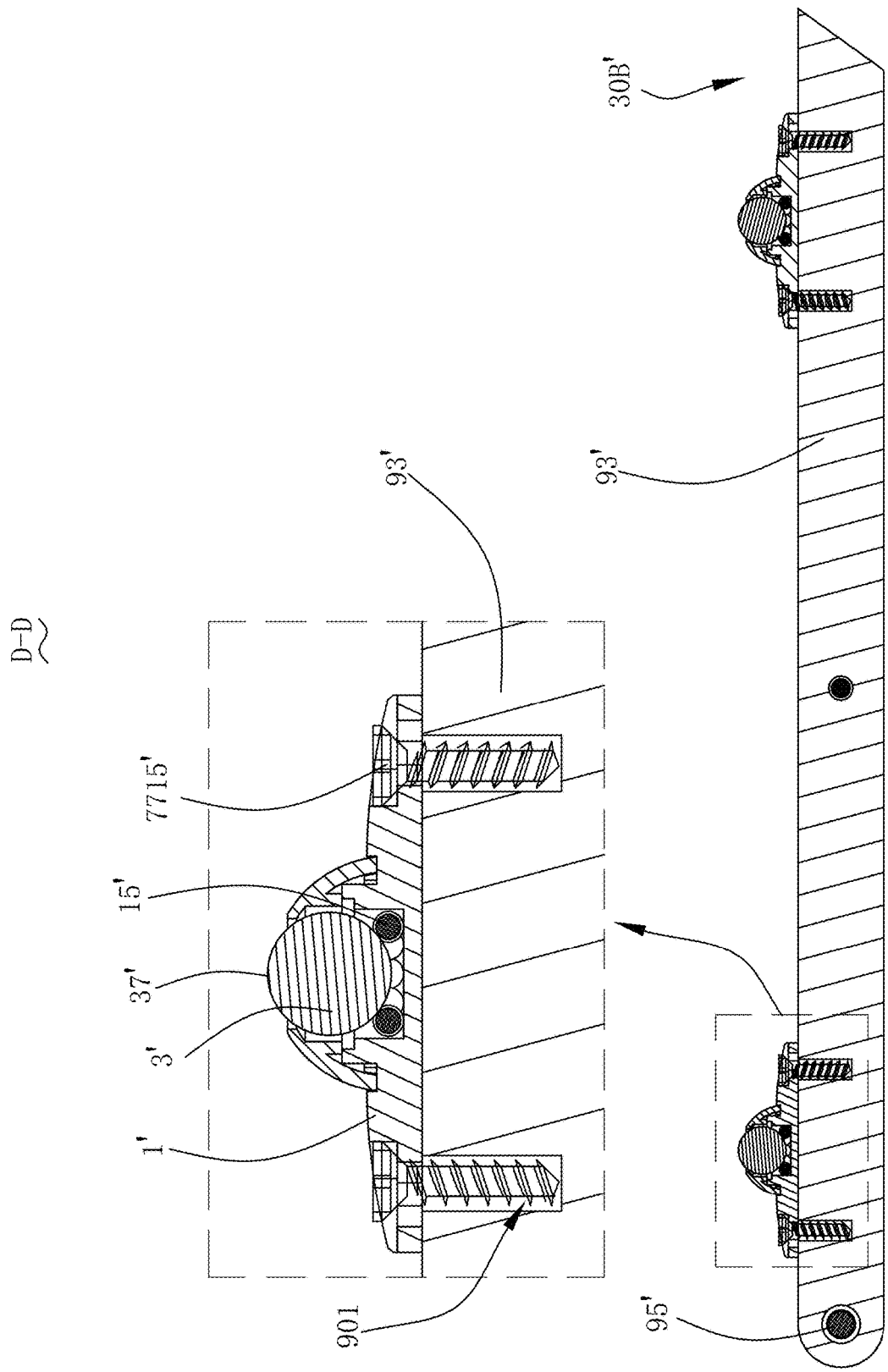
FIG. 35 is an illustrative cross-sectional view of the kickstand and the rotating devices taken along line D-D of FIG. 34.
Figure 36:
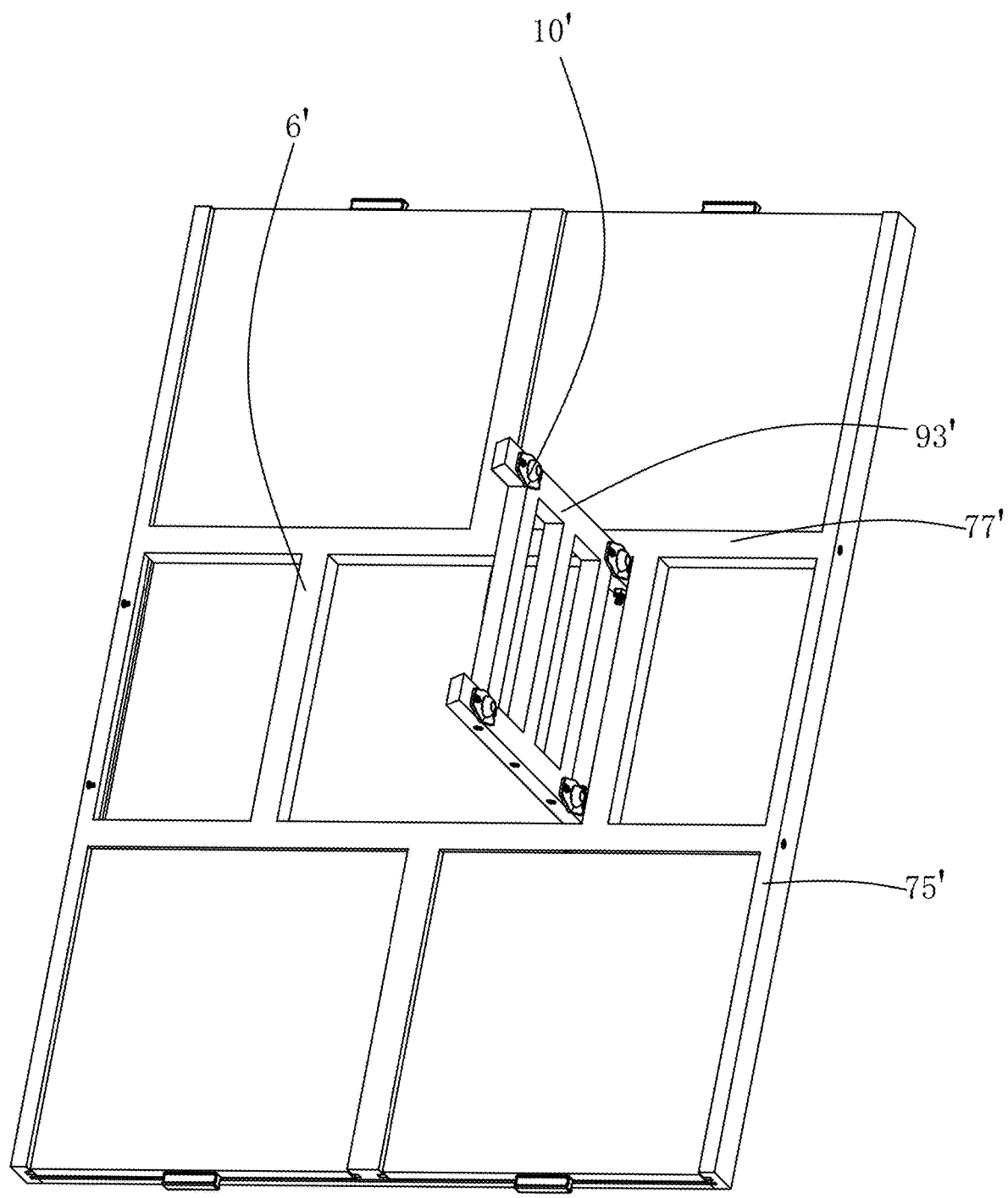
FIG. 36 is an illustrative isometric view of the jigsaw puzzle board shown in FIG. 33, showing the kickstand in the unfolded state.
Figure 37:
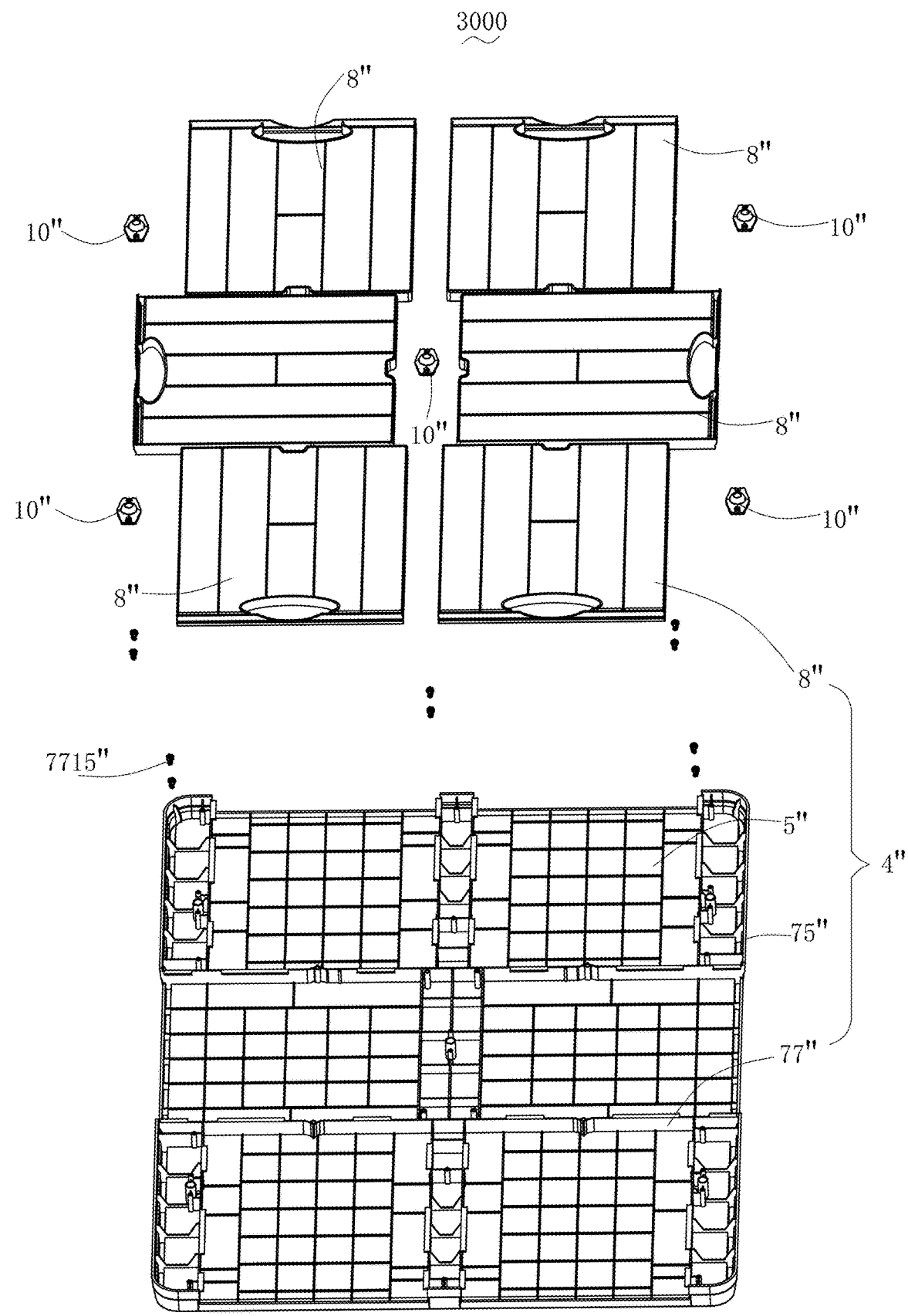
FIG. 37 is an exploded perspective view of a jigsaw puzzle board according to a third embodiment of the present invention.
Figure 38:
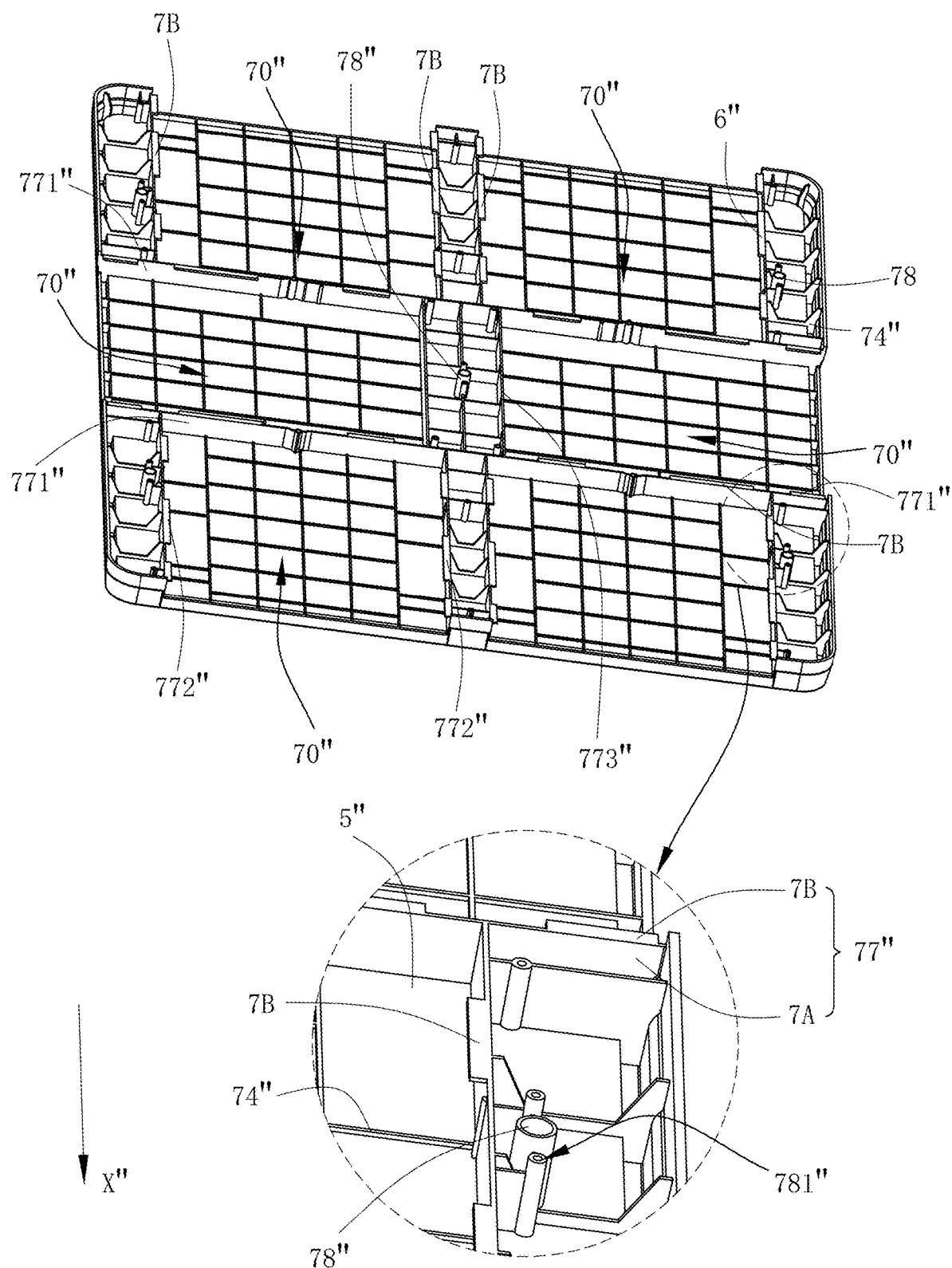
FIG. 38 is an illustrative isometric view of the jigsaw puzzle board shown in FIG. 37, omitting puzzle drawers and fasteners.
Figure 39:
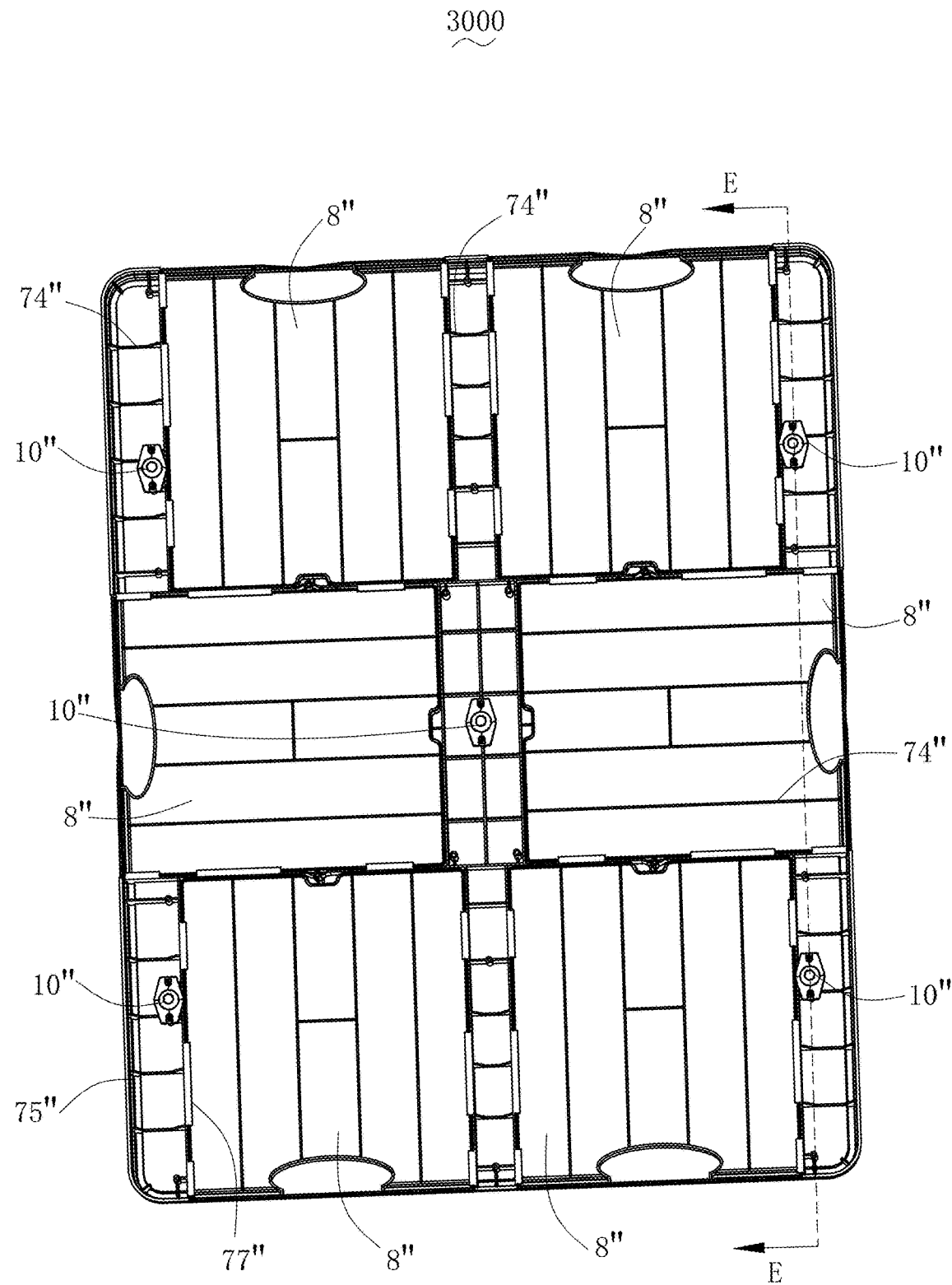
FIG. 39 is an illustrative isometric view of the jigsaw puzzle board shown in FIG. 37.
Figure 40:
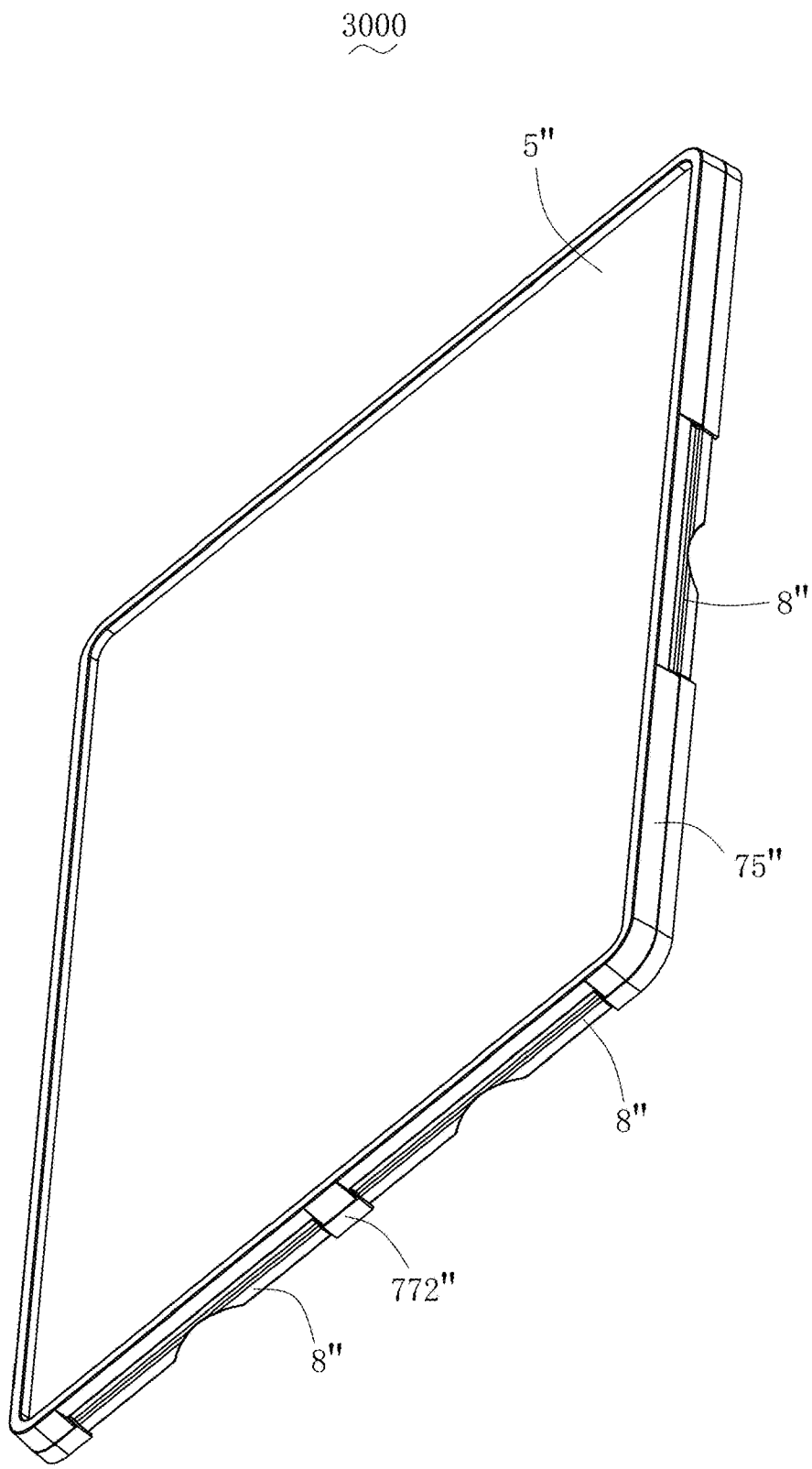
FIG. 40 is an illustrative isometric view of the jigsaw puzzle board shown in FIG. 37, viewed from a different angle.
Figure 41:
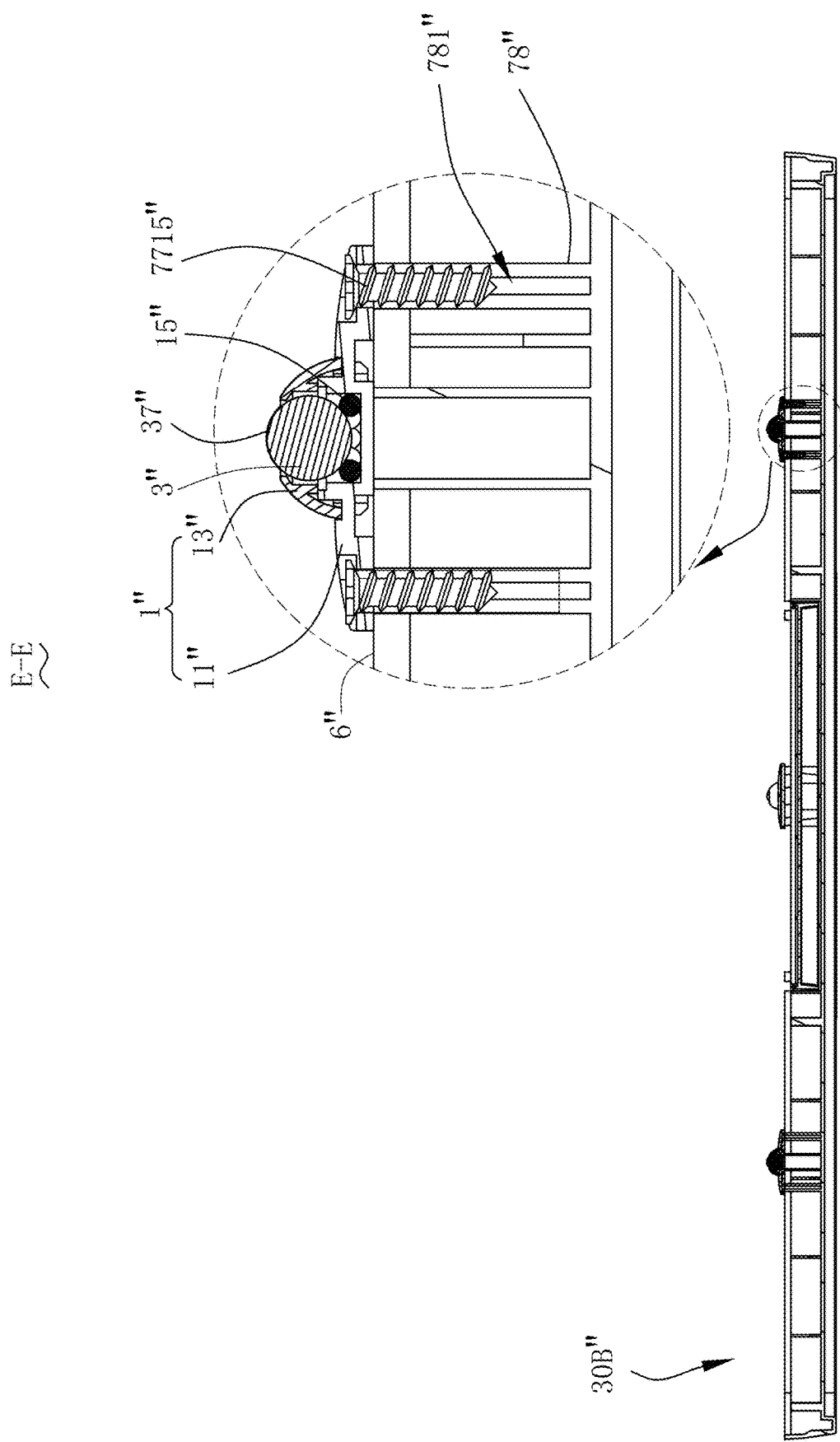
FIG. 41 is an illustrative cross-sectional view of the kickstand and the rotating devices taken along line E-E of FIG. 40.

The kickstand 9 comprises a pair of extending arms 93 spaced apart along the longitudinal direction X and a connecting arm 91. The extending arms 93 extend along the longitudinal direction X, with both ends of the connecting arm 91 extending along the lateral direction Y to connect with the extending arms 93. The extending arms 93 are rotatably connected to the first reinforcing ribs 771 via the rotating connection member 95. The rotating end 9A is the connecting end of the extending arms 93 with the rotating connection member 95. The free end 9B is the end of the extending arms 93 farthest from the rotating connection member 95. The kickstand 9 is made of metal material, while the connecting arm 91, the extending arms 93, and the rotating connection member 95 are integrally molded. Specifically, the kickstand 9 is formed by bending metal wires. It should be understood that in other embodiments, the connecting arm can be omitted, resulting in only one extending arm when the kickstand 9 does not include the connecting arm. Referring to FIGS. 29-30, the kickstand 9 comprises a plurality of connecting arms 91. The extending arms 93 and the connecting arm 91 are cube-shaped and made of strip wood or plastic. The extending arms 93 are not limited to being rotatably connected to the first reinforcing ribs 771 through the rotating connection member 95. For example, the extending arms 93 may also be rotatably connected to one of the second reinforcing ribs 772, the third reinforcing ribs 773, the stopping rib 774, the supporting frame 75, or the puzzle plate 5 through the rotating connection member 95. As shown in FIGS. 31-32, the extending arms 93 are rotatably connected to the longer walls 75A of the supporting frame 75. Understandably, the extending arms 93 may be rotatably connected to the shorter walls 75B of the supporting frame 75.

The body portion 4 further has a stopper element 76 to limit the kickstand 9 in the folded state. Since the rotating connection member 95 is designed to rotate freely, it allows the kickstand 9 to be rotated between the folded state and the unfolded state. When the kickstand 9 is rotated to the folded state, it must be restricted from further rotation to ensure stability; similarly, when the kickstand 9 is in the unfolded state, it also requires restriction to maintain stability. In this embodiment, when the kickstand 9 is in the unfolded state, the extending arms 93 abut against the stopping rib 774, thereby preventing the kickstand 9 from rotating further away from the folded state through the stopping rib 774, thus ensuring that the body portion 4 limits the kickstand 9 in the unfolded state. Conversely, when the kickstand 9 is in the folded state, at least one of the extending arms 93 is constrained between the stopper element 76 and the puzzle plate 5, enabling the stopper element 76 to effectively limit the kickstand 9 in the folded state.

In this embodiment, the body portion 4 further comprises a reinforcing element 79 connected to the first reinforcing ribs 771 and the stopping rib 774. When the kickstand 9 is in the unfolded state, the weight of the body portion 4 and the kickstand 9 jointly compress the stopping rib 774. The reinforcing element 79 may prevent the stopping rib 774 from deforming and enhance the connection strength between the first reinforcing ribs 771 and the stopping rib 774, thereby preventing damage to the connection between the first reinforcing ribs 771 and the stopping rib 774. Depending on the positioning of the kickstand 9, the reinforcing element 79 may be placed at any location on the body portion 4 as long as it can resist the pressure exerted by the kickstand 9 on the body portion 4.

The rotating connection member 95 comprises a rotating shaft 95 provided on one of the extending arms 93 and a receiving hole 7711 coupled with the rotating shaft 95. The receiving hole 7711 may be provided on one of the first reinforcing ribs 771. It should be noted that in other embodiments, the receiving hole can also be provided on one of the extending arms, with the rotating shaft located on one of the first reinforcing ribs.

Each rotating device 10 is connected to the board assembly 30 at the lower side 30B and is spaced apart from the kickstand 9. When the kickstand 9 is in the folded state, a plane in which the puzzle plate 5 is located is defined as a projection plane. A projection of the kickstand 9 on the projection plane and the projections of the rotating devices 10 on the projection plane do not overlap along a thickness direction of the body portion 4. Referring to FIGS. 9, 12-13, 29 and 31, all the rotating devices 10 are positioned around kickstand 9. The rotating devices 10 are separated from kickstand 9. If an outer edge of the kickstand forms a folded area, all the rotating devices 10 surround the kickstand and are located outside the folded area. The folded area is specifically denoted by dashed lines in FIG. 12, labeled as 98. The folded area is a roughly defined region, which is why it is represented with dashed lines in the drawing.

When the kickstand 9 is in the folded state, it does not support the body portion 4; instead, the rotating device 10 supports the body portion 4, allowing the body portion 4 to be moved and rotated on the playing surface 20 through the rotating device 10. The rotating angle of the body portion 4 is preferably set to 360° and may rotate on the playing surface 20 while moving relative to the user, or simply rotate in place on the playing surface 20.

Specifically, the rotating devices 10 have a supporting portion 37 protruded from the lower surface 6 of the body portion 4 and spaced apart from the puzzle plate 5. When the kickstand 9 is in the folded state, both the kickstand 9 and the rotating device 10 are located on the same side as the puzzle plate 5, with the kickstand 9 being closer to the puzzle plate 5 of the body portion 4 than the supporting portion 37. In this way, when the supporting portion 37 is supported by the playing surface 20, the body portion 4 is configured to be rotated by an external force applied to the rotating device 10 by the user's hand. In other words, when the kickstand 9 is in the folded state, neither the body portion 4 or the kickstand 9 will contact the playing surface 20, allowing the body portion 4 to rotated under the action of the board assembly 30 due to the external force.

Figure 12:
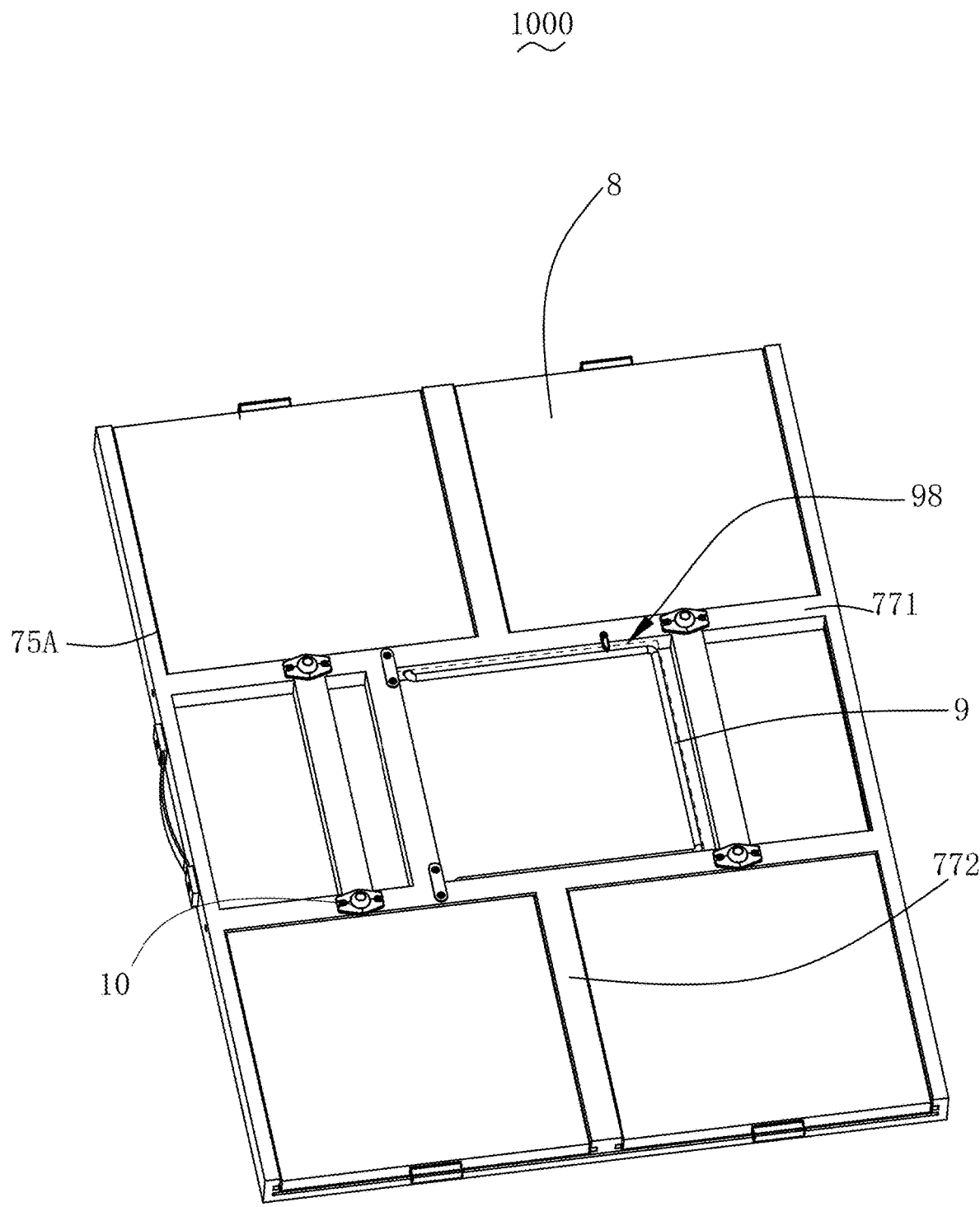
FIG. 12 is an illustrative isometric view of a jigsaw puzzle board shown in FIG. 1.
Figure 13:
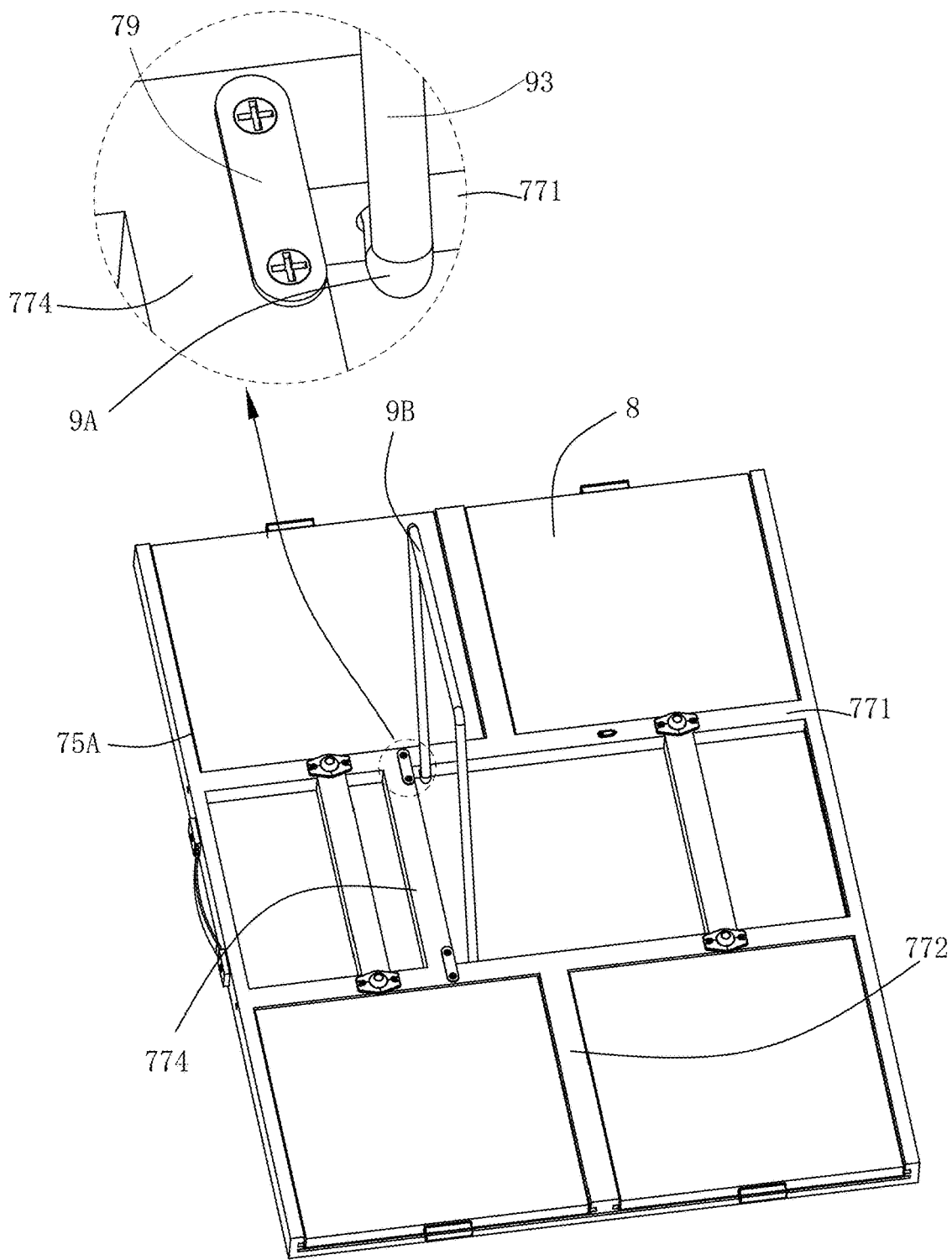
FIG. 13 is an illustrative isometric view of the jigsaw puzzle board shown in FIG. 12, showing the kickstand in an unfolded state.
Figure 14:
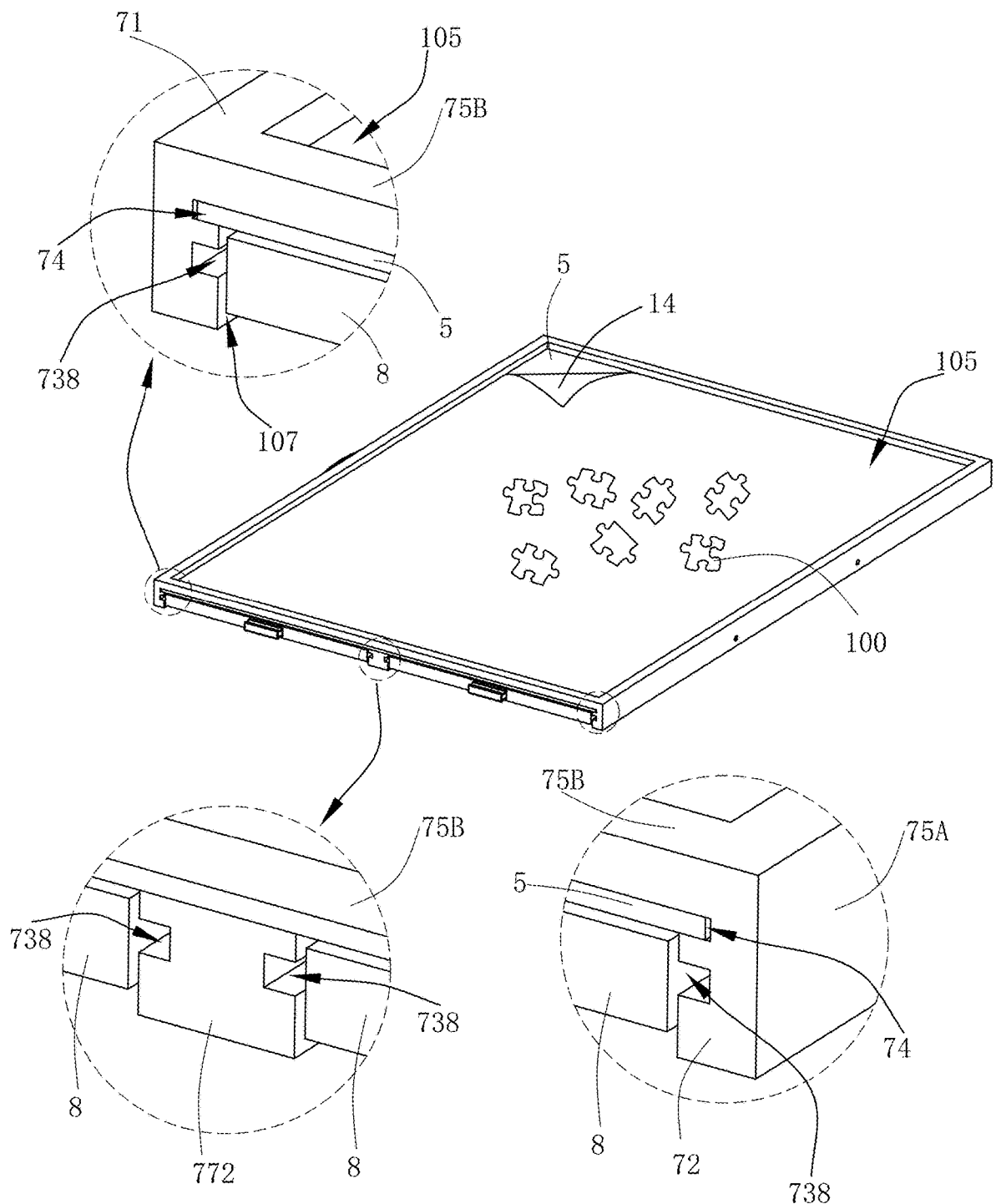
FIG. 14 is an illustrative isometric view of the jigsaw puzzle board shown in FIG. 12, viewed from a different angle.
Figure 15:
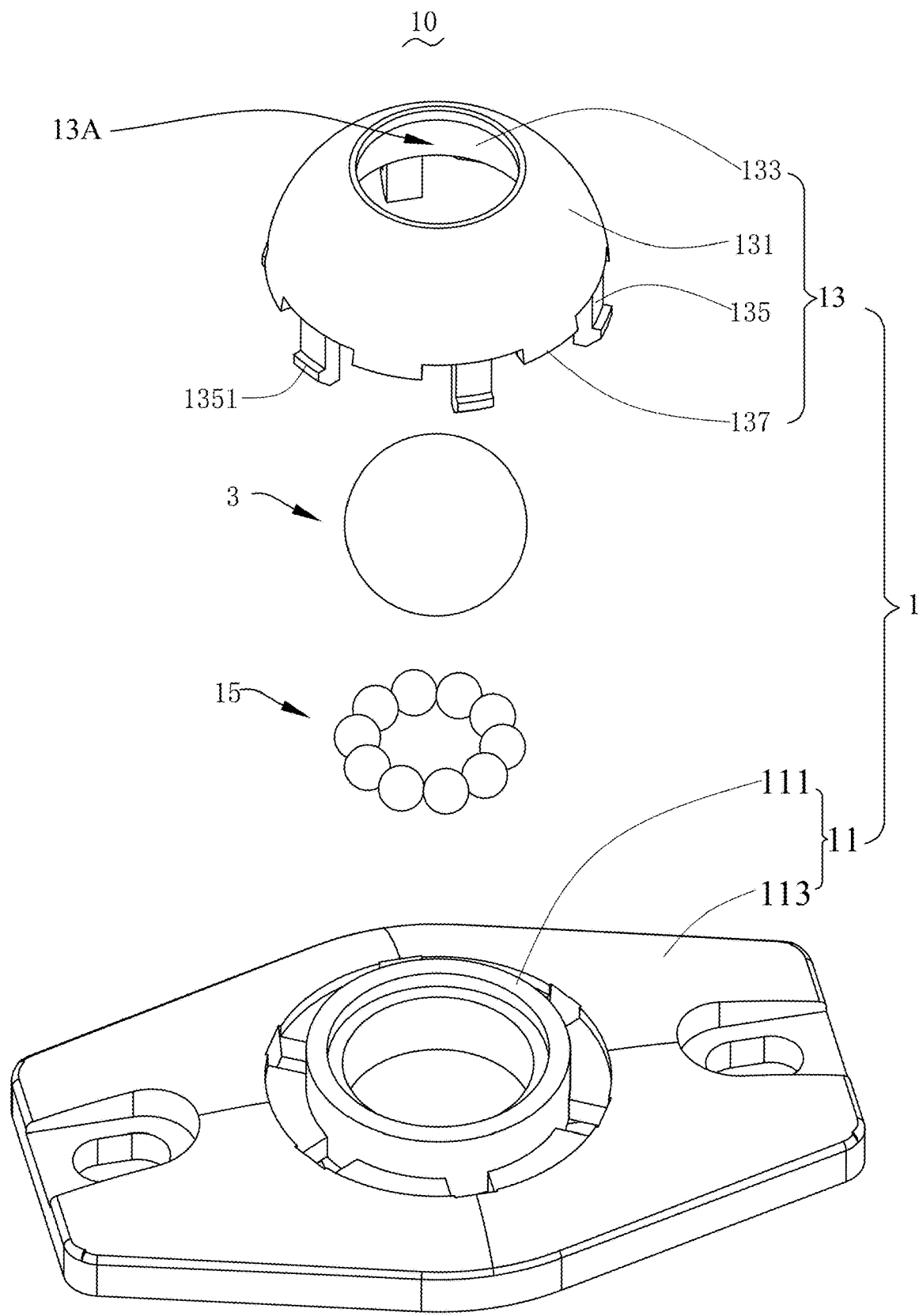
FIG. 15 is an exploded perspective view of the rotating device of the jigsaw puzzle board shown in FIG. 1.
Figure 16:
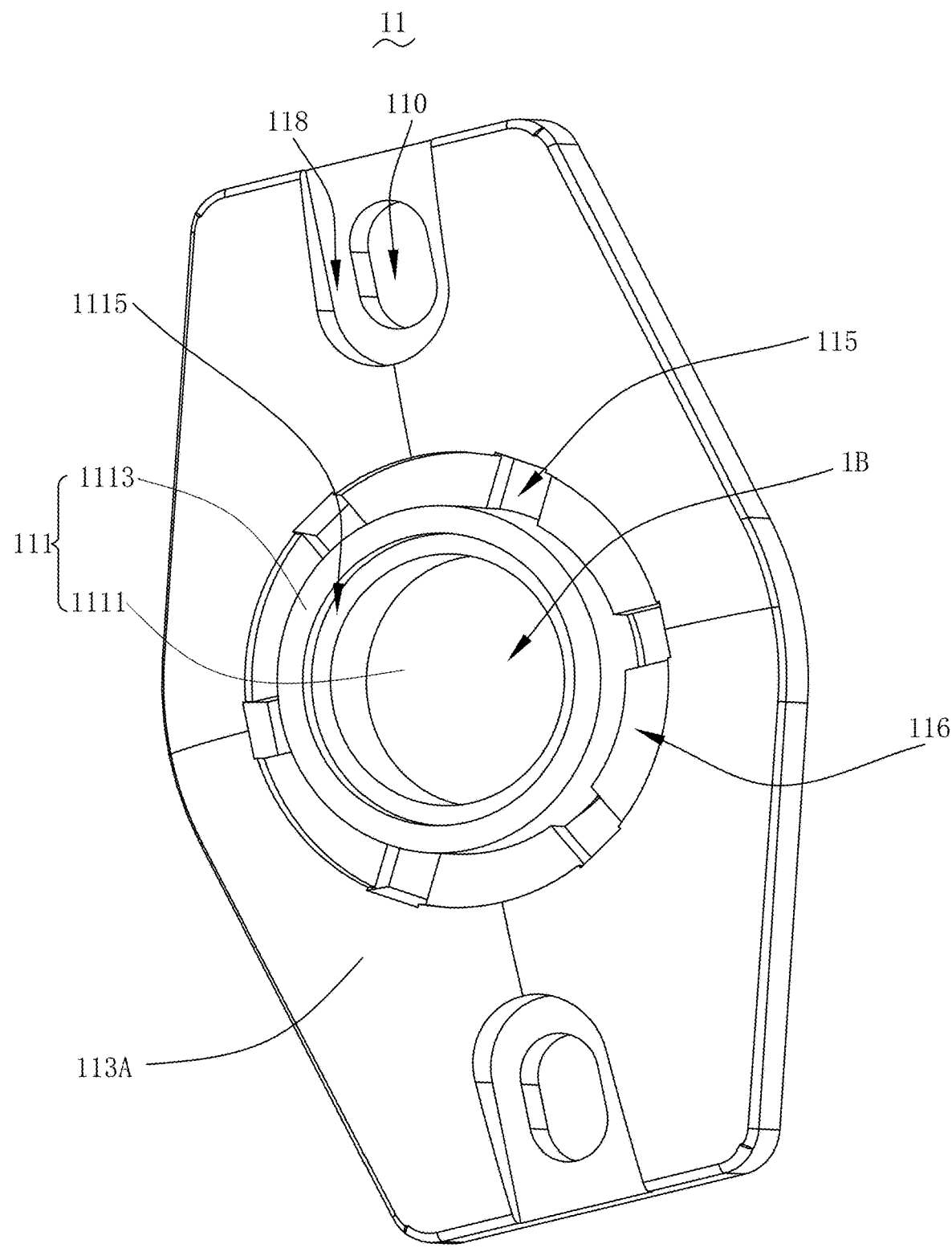
FIG. 16 is an illustrative isometric view of a base of the rotating device shown in FIG. 15.

The number of rotating devices 10 may be determined based on actual needs and may be one, two, or more than two. In this embodiment, jigsaw puzzle board 1000 comprises at least three rotating devices 10 used for collectively supporting the board assembly 30 and allowing the board assembly 30 to move smoothly along with the rotating devices 10. The rotating devices 10 may be fixed on the puzzle plate 5, the supporting frame 75, or the reinforcing member 77. When each rotating device 10 is attached to the supporting frame 75, it is fixed on the longer walls 75A of the supporting frame 75, as shown in FIGS. 31-32. Understandably, the rotating devices 10 may also be on the shorter walls 75B, or the rotating devices 10 may be on both the longer walls 75A and the shorter walls 75B simultaneously. Alternatively, when the rotating devices 10 are mounted on the reinforcing member 77, they are fixed on the first reinforcing ribs 771 of the reinforcing member 77, as depicted in FIGS. 12-13. Additionally, the rotating devices 10 may be secured to any of the following: the first reinforcing ribs 771, the second reinforcing ribs 772, the third reinforcing ribs 773, or the stopping rib 774. For instance, installing the rotating device 10 on the second reinforcing ribs 772 and/or the third reinforcing ribs 773, or only on the second reinforcing ribs 772. In conclusion, the rotating devices 10 may be secured to any position on the body portion 4, as long as it ensures that the rotating devices 10 effectively drive the body portion 4 for stable rotation and movement on the playing surface 20.

The structures of the rotating devices are identical. This embodiment provides a detailed description of the specific structure of any one of the rotating devices. As shown in FIGS. 11-28, The rotating device 10 is configured to move and rotate on the playing surface 20. The rotating device 10 comprises a case 1, a first roller 3 received in the case 1 and second rollers 15 received in the case 1 and contacted with the first roller 3. The case 1 comprises a base 11 and a housing 13 mounted on the base 11 to form a receiving space 1A. The housing 13 has an opening 13A passing through it and communicated with the receiving space 1A. The first roller 3 rotates about its rotating axis O and comprises an inner part 31 received within the receiving space 1A and an outer part 33 extending through the opening 13A configured to make contact with the playing surface 20. The second rollers 15 are arranged in the receiving space 1A and are configured to space the first roller 3 apart from the base 11. The first roller 3 are configured to rotate together with the second rollers 15. The number of second rollers 15 is greater than two, and they are arranged around the first roller 3.

When the first roller 3 rotates, a volume of the inner part 31 is greater than a volume of the outer part 33. This design allows the inner part 31 to be stably received within the receiving space 1A. The materials of both the first roller 3 and the second roller 15 are the same. They may be either metal balls or non-metal balls. Metal balls may include stainless steel balls, aluminum alloy balls, etc., while non-metal balls may include ceramic balls, plastic balls, etc. The first roller 3 and the second rollers 15 may rotate synchronously, meaning they have the same linear rotational speed; or they may rotate asynchronously, allowing for relative rotation between them while still rotating together. The radius of the first roller 3 is greater than the radius of the second rollers 15. This design is advantageous in reducing the overall volume of the rotating device 10 and decreasing the rotational resistance torque of the first roller 3. The centers of each of the second rollers 15 lie on a same circumference. During motion, adjacent second rollers 15 may be either in contact or separated, but the second rollers 15 constantly maintain contact with the first roller 3 without separating. Optionally, the second rollers 15 may be of elongated cylinder shape or any other shape that ensures free rolling rotation of the first roller 3. The second rollers 15 may not support the first roller 3 for 360° rotation. They only support the first roller 3 to slide in one direction.

The receiving space 1A comprises a first space 1B formed on the base 11 and a second space 1C formed on the housing 13. The second space 1C is communicated with the opening 13A and the first space 1B. The first space 1B is cylindrical. The opening 13A is circular.

Figure 11:
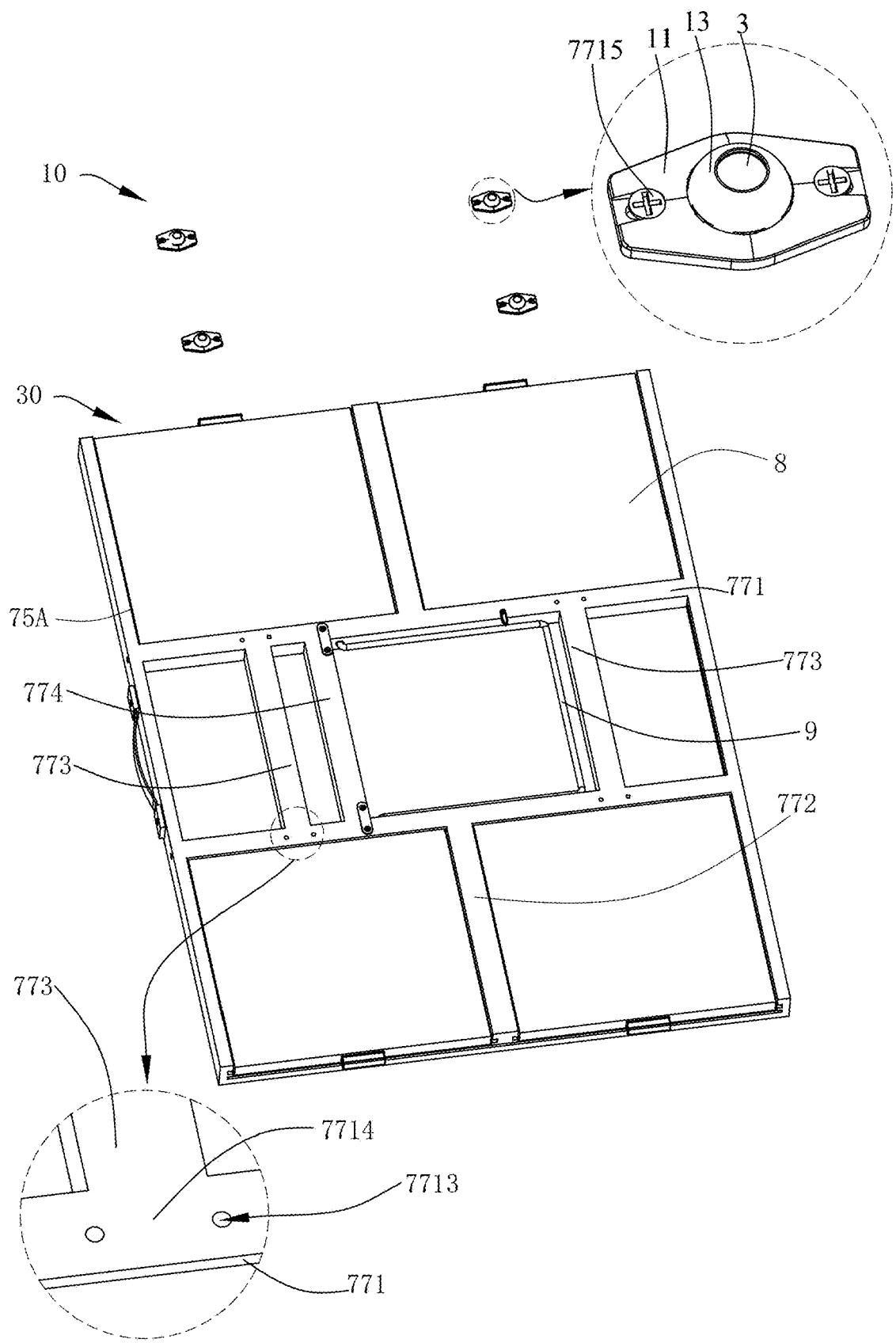
FIG. 11 is an exploded perspective view of rotating devices and a board assembly of the jigsaw puzzle board shown in FIG. 1.
Figure 17:
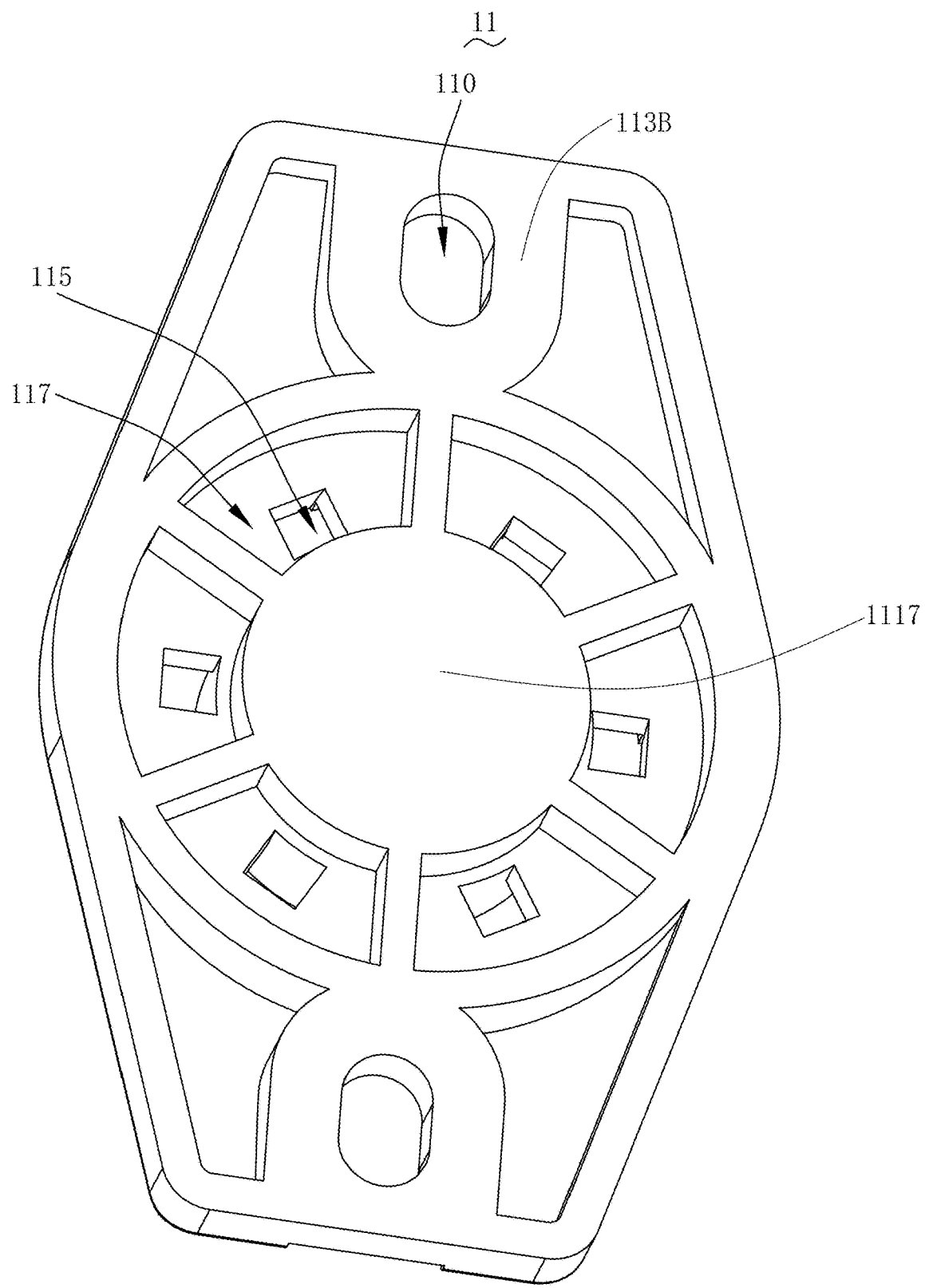
FIG. 17 is an illustrative isometric view of the base of the rotating device shown in FIG. 16, viewed from a different angle.
Figure 18:
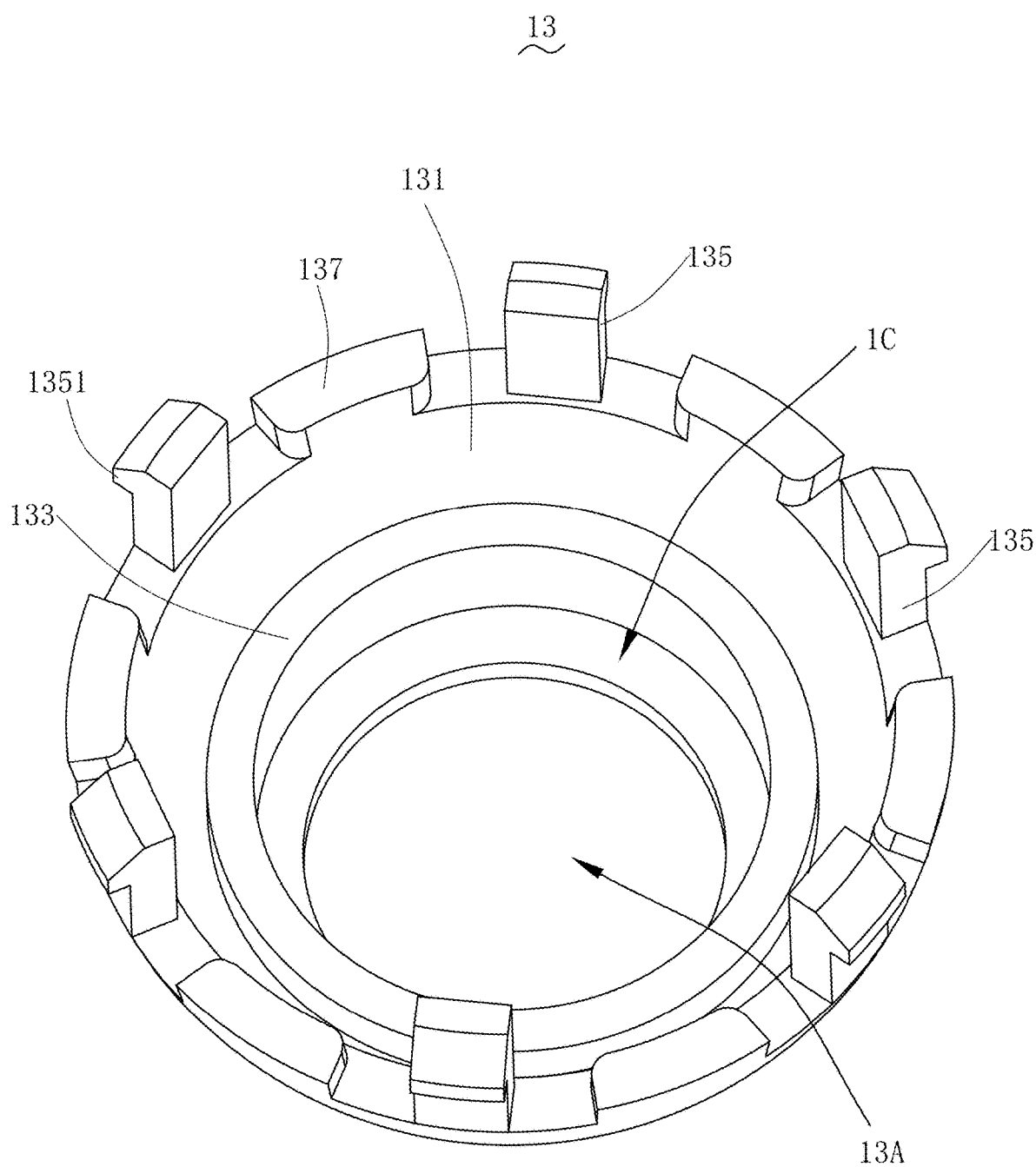
FIG. 18 is an illustrative isometric view of a housing of the rotating device shown in FIG. 15.
Figure 19:
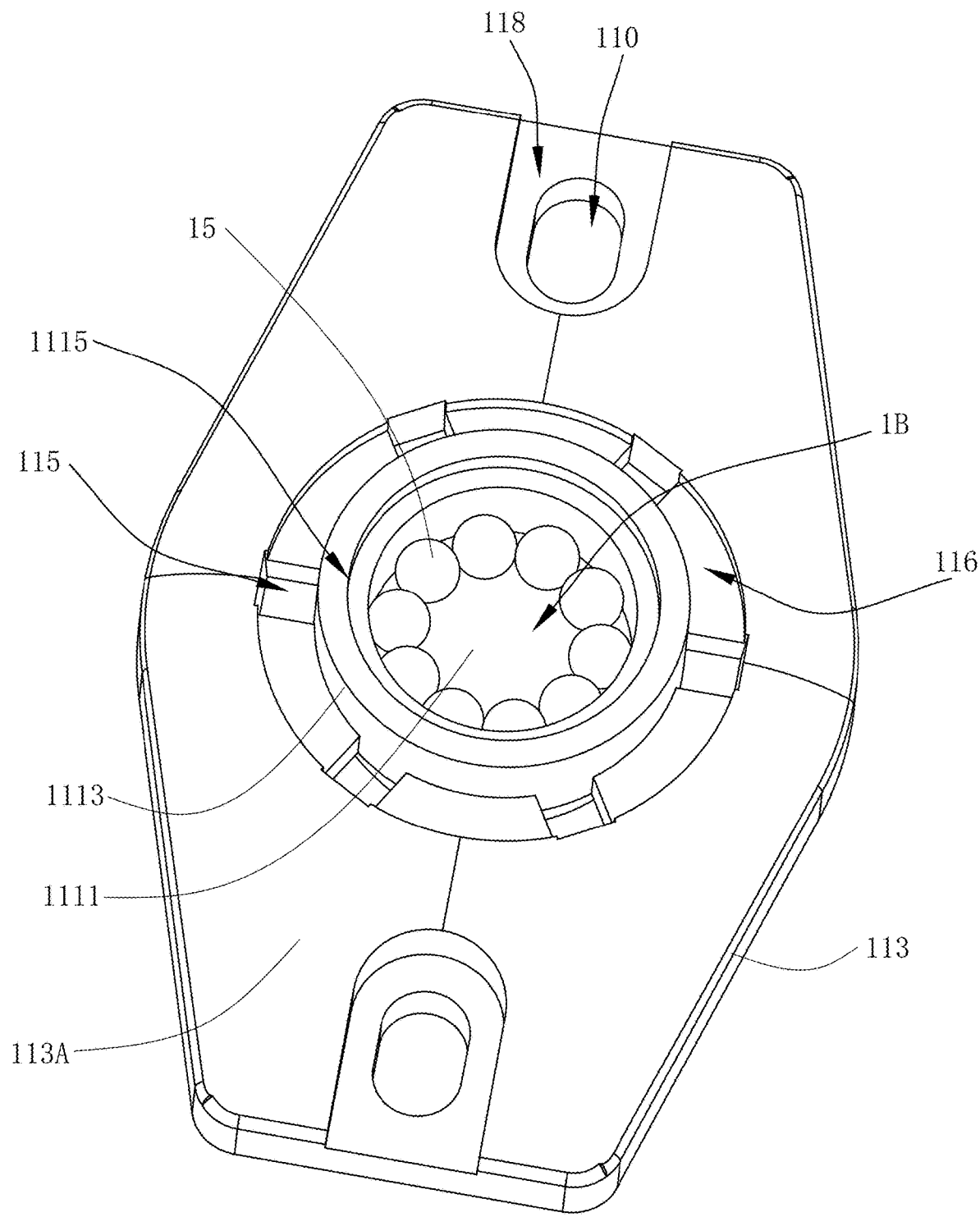
FIG. 19 is an illustrative isometric view of the base and second rollers of the rotating device shown in FIG. 15.
Figure 20:
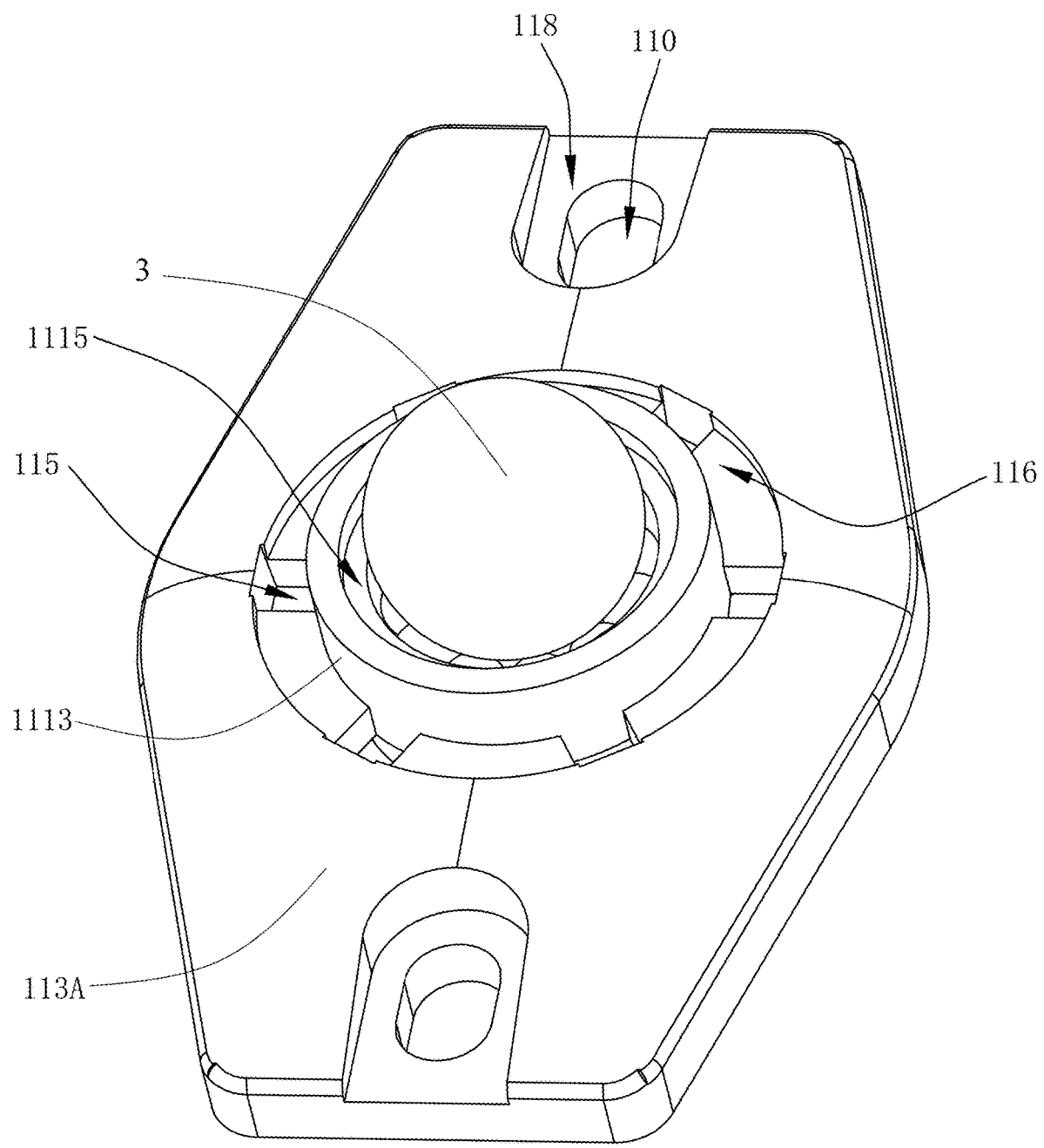
FIG. 20 is an illustrative isometric view of a first roller, the base and second rollers of the rotating device shown in FIG. 15.
Figure 21:
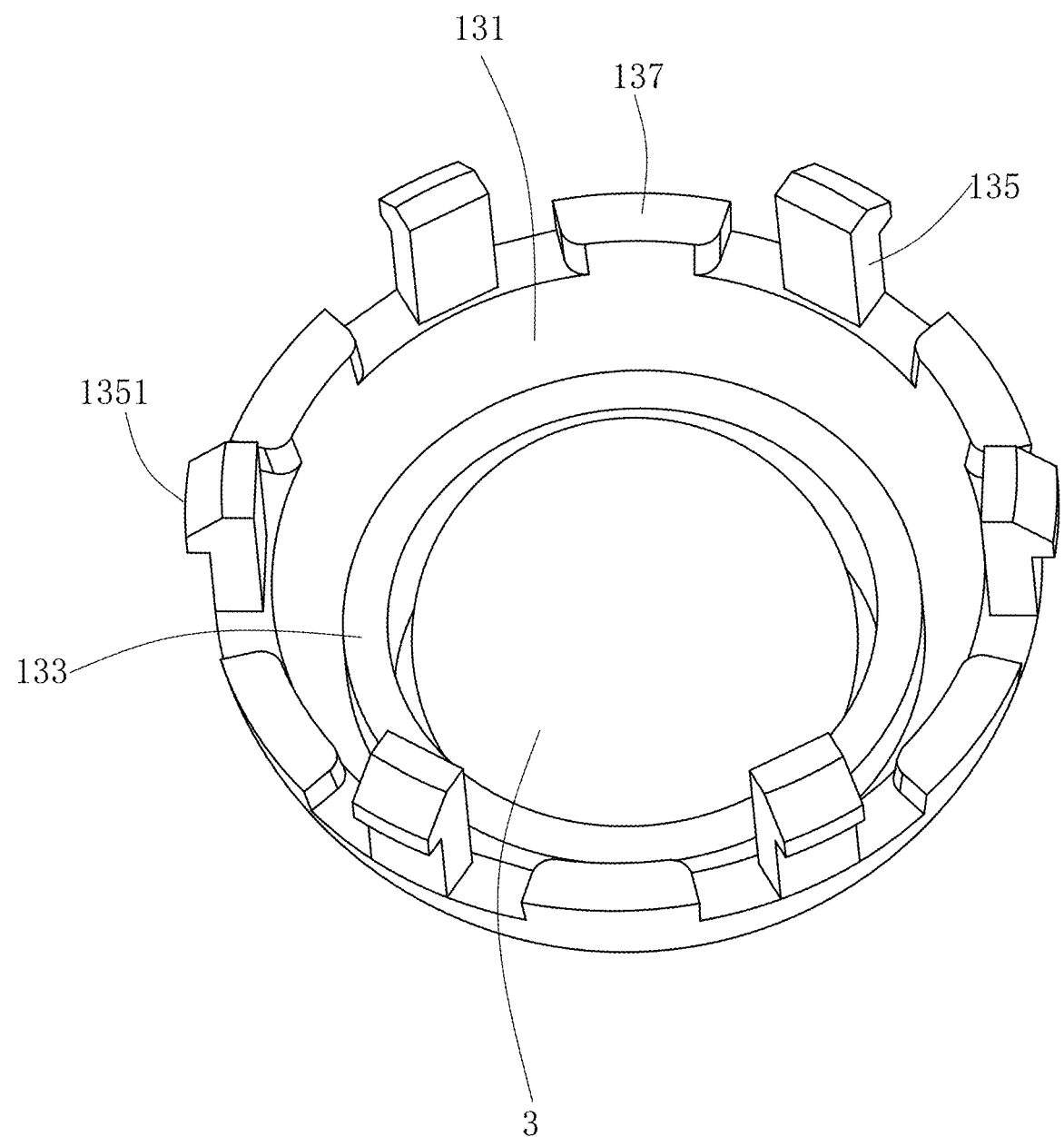
FIG. 21 is an illustrative isometric view of the first roller and the housing of the rotating device shown in FIG. 15.
Figure 22:
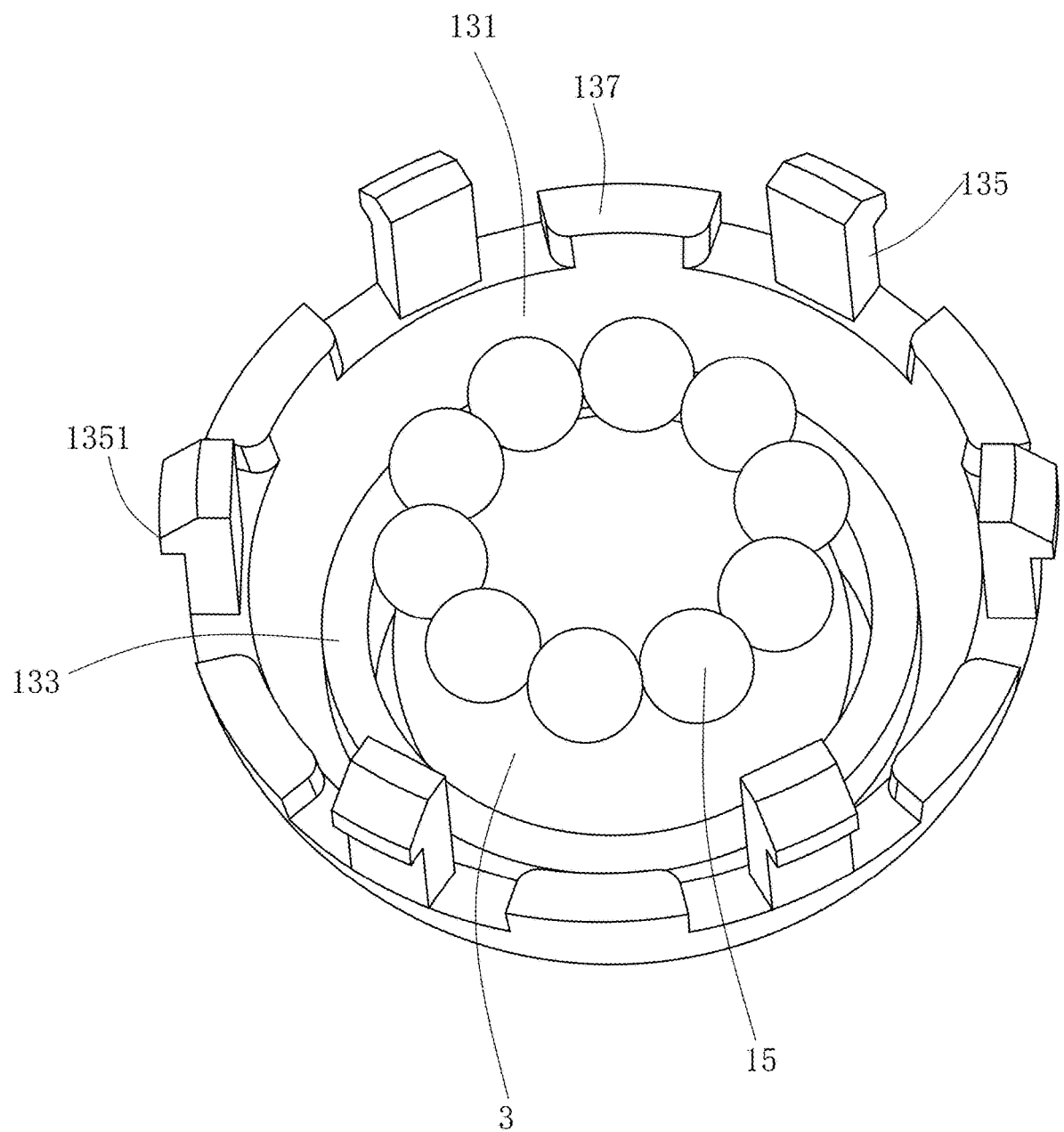
FIG. 22 is an illustrative isometric view of the first roller, the second rollers and the housing of the rotating device shown in FIG. 15.
Figure 23:
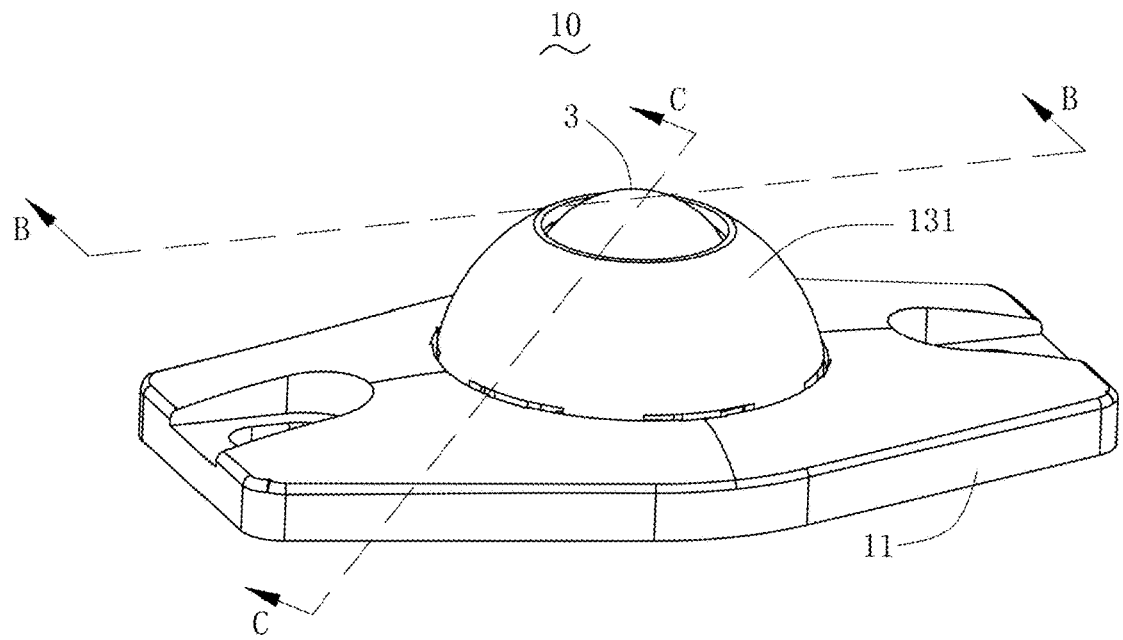
FIG. 23 is an illustrative isometric view of the rotating device shown in FIG. 15.
Figure 24:
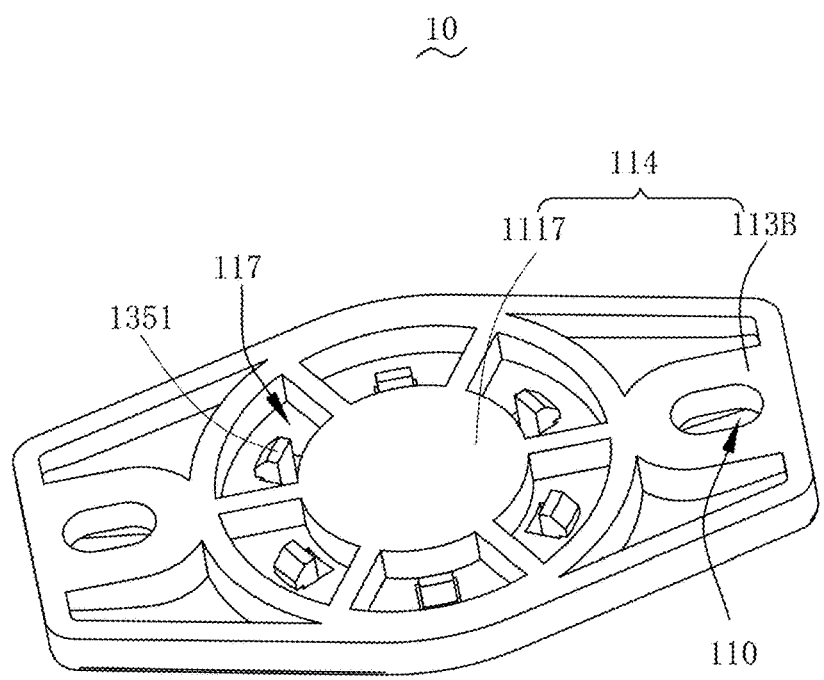
FIG. 24 is an illustrative isometric view of the rotating device shown in FIG. 13, viewed from a different angle.
Figure 25:
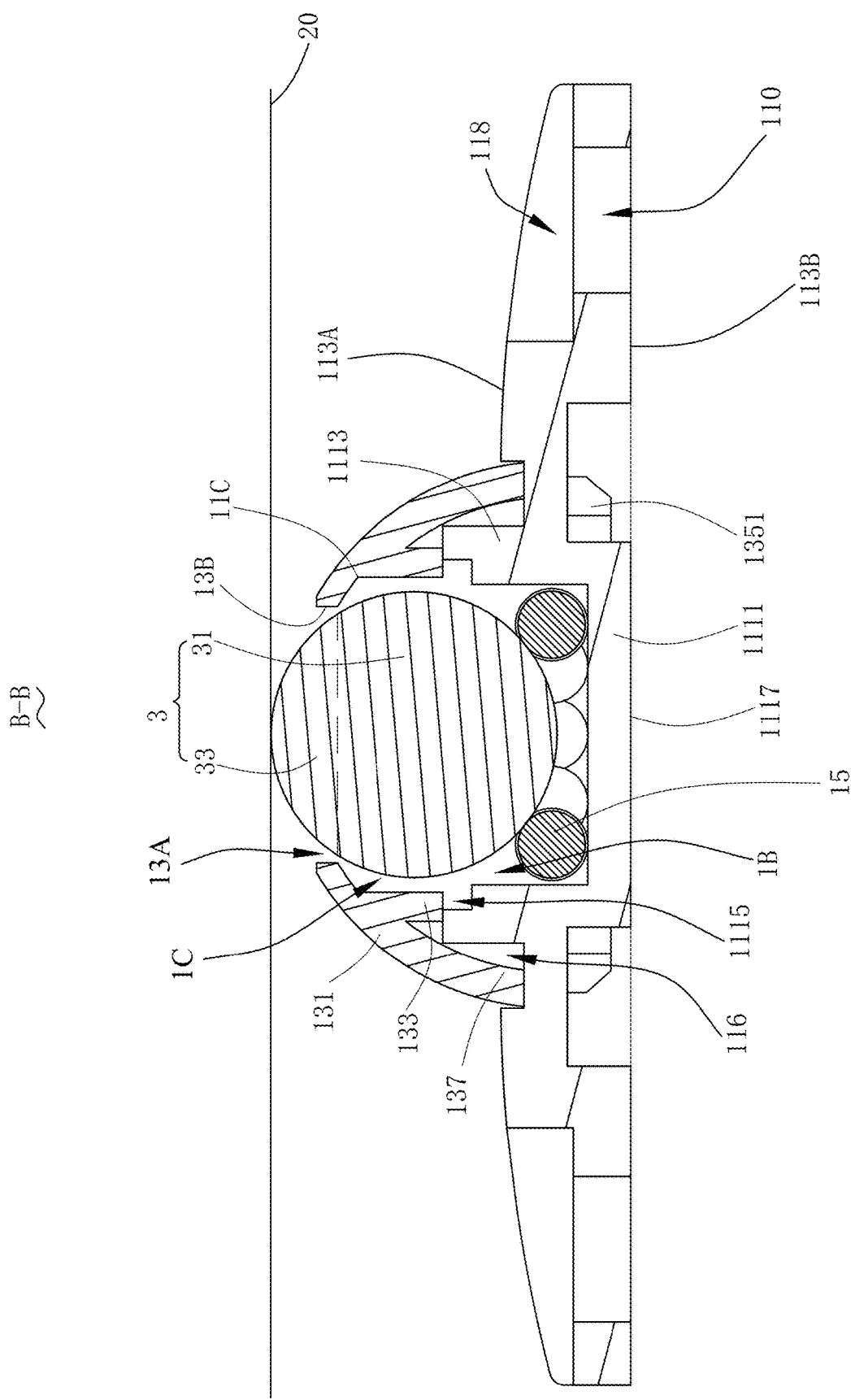
FIG. 25 is an illustrative cross-sectional view of the rotating device taken along line B-B of FIG. 23.
Figure 26:
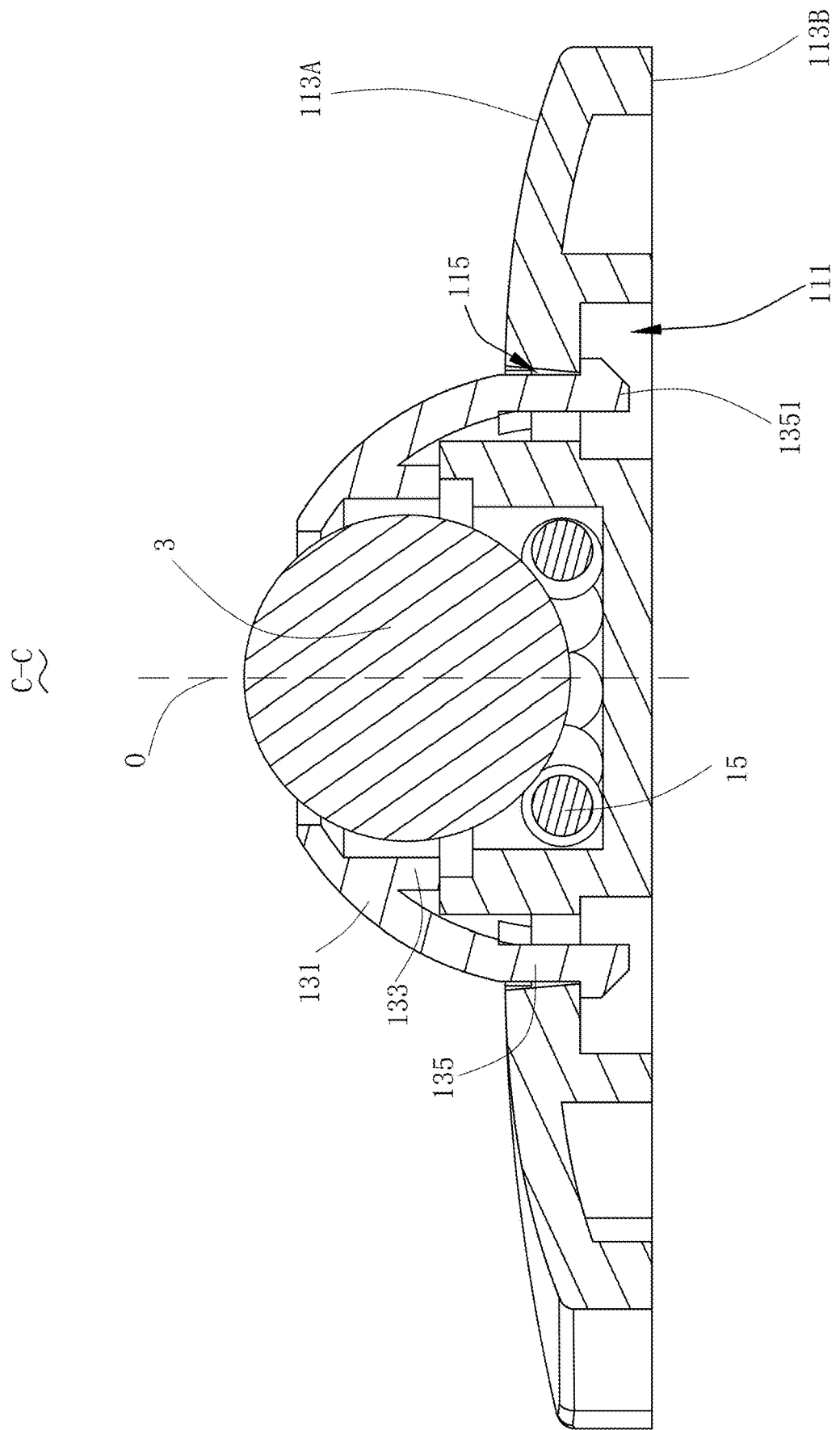
FIG. 26 is an illustrative cross-sectional view of the rotating device taken along line C-C of FIG. 23.

The base 11 comprises a main portion 111 surrounding the first space 1B and a fixing portion 113 extending from the main portion 111 and fixed on the body portion 4. The main portion 111 comprises an engaging wall 1111 and a side wall 1113 extending from the engaging wall 1111 for forming the first space 1B together with the engaging wall 1111. The second rollers 15 abut against both the engaging wall 1111 and the side wall 1113. The base 11 further comprises a connecting surface 114 mounted on the first reinforcing ribs 771 of the body portion 4. The connecting surface 114 is substantially flat and comprises a mounting surface 1117 formed on the engaging wall 1111 located away from the second rollers 15, and a fixing surface 113B formed on the fixing portion 113, which is coplanar with the mounting surface 1117. Both the mounting surface 1117 and the fixing surface 113B are substantially flat. Referring to FIGS. 11 and 17, the first reinforcing ribs 771 comprises contacting portions 7714 for fixing the rotating devices 10. The contacting portion 7714 are also substantially flat. The board assembly 30 is in planar contact with the base 11. Compared to a related method of fixing the rotating device 10 by drilling a receiving slot in the board assembly 30, the planar fixation method is beneficial for preventing deformation of the board assembly 30 itself. Both the supporting frame 75 and the reinforcing member 77 have complete surfaces without slots, which help support the puzzle plate 5 better. This also aids in preventing deformation of the supporting frame 75 and reinforcing member 77 themselves.

The fixing portion 113 further has an outer surface 113A opposite to the fixing surface 113B. The second rollers 15 are arranged between the engaging wall 1111 and the first roller 3 to space the first roller 3 apart from the engaging wall 1111.

The base 11 and the housing 13 may be directly fixed and/or connected in a detachable manner. The direct fixing methods for the base 11 and the housing 13 include ultrasonic welding. The detachable connection methods for the base 11 and the housing 13 may involve snap-fit connection, threaded connection, etc. In this embodiment, the base 11 and the housing 13 are detachably connected, and the connection method for the detachable connection of the base 11 and the housing 13 is a snap-fit connection. The base 11 comprises mounting holes 110 spaced apart from the housing 13. The rotating device 10 is fixed to the base 11 by fasteners 7715 passing through the corresponding mounting hole 110. The first reinforcing ribs comprise a connecting hole 7713. The rotating device 10 is secured to the board assembly 30 by the fasteners 7715 passing through the mounting holes 110 on the base 11 and the connecting hole 7713.

The body portion 4 further comprises a lower surface 6 provide on the lower side 30B and spaced far away from the puzzle plate 5. In this embodiment, the lower surface 6 is arranged on the part of the first reinforcing ribs 771 and is in contact with the connecting surface 114. In an alternative embodiment, the lower surface may be arranged on other components of the reinforcing member 77, such as the second reinforcing ribs 772. Alternatively, the lower surface may be arranged on either the supporting frame 75 or the kickstand 9. The outer part 33 of the rotating device 10 has a supporting portion 37 protruded from the lower surface 6 of the board assembly 30. The supporting portion 37 is directly contacted with the playing surface 20. When the kickstand 9 is folded on the body portion 4, at least a part of the first roller 3 protrudes to form the supporting portion 37 contacted with the playing surface 20. The supporting portion 37 is located further away from the puzzle plate 5 compared to the lower surface 6.

The fixing portion 113 further comprises a plurality of through-holes 115 arranged around the main portion 111, a plurality of positioning slots 116, a plurality of engaging grooves 117 recessed from the fixing surface 113B to the outer surface 113A and a fixing groove 118 recessed from the outer surface 113A to the fixing surface 113B. Each positioning slot 116 is positioned between two adjacent through-holes 115 and spaced apart from the mounting holes 110. Each mounting hole 110 penetrates the fixing portion 113 from the outer surface 113A to the fixing surface 113B. Each fixing groove 118 is arranged around the corresponding mounting hole 110 and communicates with the mounting hole 110. Each fixing groove 118 is configured to accommodate the fasteners 7715, thereby preventing the fasteners 7715 from obstructing the normal movement of the rotating device 10.

The housing 13 comprises a dome 131 covered on the main portion 111 and a surrounding wall 133 extending from the dome 131 towards the side wall 1113 to form the second space 1C together with the dome 131. The opening 13A is formed in the dome 131. The surrounding wall 133 abuts against the side wall 1113 to facilitate communication between the second space 1C, the first space 1B, and the opening 13A. At one end of the side wall 1113, opposite from the engaging wall 1111, a circular groove 1115 is formed to communicate with both the first space 1B and the second space 1C. The dome 131 is placed over on the main portion 111 and fixed to the fixing portion 113. The surrounding wall 133 is configured to guide the first roller 3 for stable rotation. In an alternative embodiment, the surrounding wall may be omitted, allowing the dome 131 to directly guide the rotational motion of the first roller 3.

The housing 13 further comprises a plurality of hooks 135 extending from the dome 131 towards the through-holes 115, and a plurality of abutting portions 137 extending from the dome 131 and positioned between adjacent hooks 135. The hooks 135 pass through the through-holes 115 to connect the housing 13 with the fixing portion 113 of the base 11. The positioning slots 116 receive the abutting portions 137, thereby causing the abutting portions 137 to abut against an inner wall of the positioning slots 116. After the connection between the housing 13 and the base 11, the abutting portions 137 prevent misalignment between the first roller 3 and the second rollers 15 caused by deformation of the hooks 135. Each hook 135 comprises a head 1351 accommodated within a corresponding engaging groove 117.

When the rotating device 10 is in use, the outer part 33 comes into contact with the playing surface 20, and the playing surface 20 exerts frictional resistance on the first roller 3. When the external force acts on the first roller 3 to drive it into rotation, the spherical structure of the first roller 3 allows it to rotate in any direction based on the direction of the applied external force. This enables the rotating device 10 to move in any direction or perform self-rotation within the playing surface 20, functioning as a universal wheel.

When there is no external force acting on the first roller 3, the first roller 3 does not rotate. The rotating device 10 is solely used to support the board assembly 30 on the playing surface 20. If the external force acting on the first roller 3 cannot overcome the rotational resistance of the first roller 3, the first roller 3 will remain stationary. The rotational resistance of the first roller 3 comprises the frictional resistance between the case 1 and the first roller 3, as well as the frictional resistance between the playing surface 20 and the first roller 3. The external force acting on the first roller 3 typically affects it indirectly. For example, a user may rotate the board assembly 30 and the case 1 by hand to apply the external force to the first roller 3.

The first roller 3 is in contact with the second rollers 15, and due to the friction between them, when the first roller 3 rotates, it drives the second rollers 15 to rotate through this friction. The space between the first roller 3 and the base 11, provided by the second rollers 15, helps prevent wear on the first roller 3 caused by friction with the base 11.

The present invention provides the rotating device 10, allowing the orientation of the jigsaw puzzle board 1000 to be adjusted flexibly. This means that the optimal viewpoint may be adjusted in real-time according to the location of the user currently working on the puzzle pieces 100, without requiring the user to move. Particularly during collaborative sessions involving multiple users, this rotatable design enables different users to switch their optimal viewpoint of the jigsaw puzzle board, allowing each user to maintain their ideal perspective, which significantly enhances both efficiency and user experience. Furthermore, when the jigsaw puzzle board 1000 is large, the optimal viewpoint on the opposite side may also be rotated to face the user directly. After accessing the puzzle pieces 100, the user may rotate it back to its original position without needing to walk around. Therefore, the rotating device 10 fundamentally alters the structural characteristics of the related jigsaw puzzle board 1000, enabling the product to adapt to user habits and greatly improving the overall user experience.

FIGS. 31-34 show a jigsaw puzzle board 2000 of a second embodiment of the present invention. The jigsaw puzzle board 2000 according to the second embodiment is illustrated, wherein the jigsaw puzzle board 2000 comprises a board assembly 30', a rotating device 10' located below the board assembly 30' and connected with the board assembly 30'. The board assembly 30' comprises a body portion 4' and a kickstand 9' located below the body portion 4'. The kickstand 9' is coupled with the body portion 4' and configured to be in either a folded state or an unfolded state relative to the body portion 4'.

The body portion 4' comprises a puzzle plate 5', at least one puzzle drawer 8' disposed under the puzzle plate 5', a supporting frame 75' supporting the puzzle plate 5', and a reinforcing member 77' located below the puzzle plate 5' for supporting the puzzle plate 5'. The reinforcing member 77' comprises a pair of first reinforcing ribs 771', a pair of second reinforcing ribs 772', and a pair of third reinforcing ribs 773'.

The second embodiment is similar to the first embodiment of the present invention except for the following differences: (1) the structure of the kickstand 9'; (2) the rotating device 10' is fixed on the kickstand 9' via a fastener 7715', and when the kickstand 9' is in the folded state, the rotating device 10' is positioned on the kickstand 9' far from the puzzle plate 5'. Correspondingly, a fixing hole 901 engaged with fastener 7715' is provided on the kickstand 9'; (3) the stopping rib 774 of the first embodiment is omitted.

The kickstand 9' comprises a pair of extending arms 93' and at least one connecting arm 91' connected to the extending arms 93'. The extending arms 93' and the connecting arm 91' are cube-shaped, thereby providing a flat contact surface for the rotating device 10' on the kickstand 9'. The extending arms 93' and the connecting arm 91' are made of strip wood or plastic, with the rotating device 10' fixed onto the extending arms 93'. Accordingly, a fixing hole 901 is formed on the extending arms 93'.

The rotating device 10' comprises a case 1', a first roller 3' housed in the case 1', and a plurality of second rollers 15' also housed in the case 1' and contacted with the first roller 3' to rotate with the first roller 3'. The base 11' is secured to the extending arms 93' via the fastener 7715' engaged with the fixing hole 901, thereby firmly attaching the rotating device 10' to the kickstand 9'.

The base 11' is in planar contact with the extending arms 93'. When the kickstand 9' is in the folded state, it provides better support for the puzzle plate 5' and helps prevent deformation of the puzzle plate 5'. There are two rotating devices 10' on each the extending arm 93', with one rotating device 10' positioned near a free end 9B' of the kickstand 9' and the other rotating device 10' positioned near a rotating end 9A' of the kickstand 9'.

Due to the omission of the stopping rib 774, when the kickstand 9' is in the unfolded state, the extending arms 93' come into contact with the third reinforcing rib 773', and the rotating device 10' near the rotating end 9A' of the kickstand 9' is spaced from the third reinforcing rib 773'. In the unfolded state, on one hand, the contact between the extending arms 93' and the third reinforcing rib 773' restricts the kickstand 9', while on the other hand, the spacing between the rotating device 10' near the rotating end 9A' of the kickstand 9' and the third reinforcing rib 773' prevents any force interaction between them, thereby avoiding damage to the rotating device 10'.

The body portion 4' further comprises a lower surface 6' provided on a lower side 30B' and spaced far away from the puzzle plate 5'. In this embodiment, the lower surface 6' is arranged on the reinforcing member 77'. The kickstand 9' is closer to the puzzle plate 5' than the lower surface 6'. The rotating devices 10' have a supporting portion 37' protruded from the lower surface 6'' of the reinforcing member 77' and spaced apart from the puzzle plate 5'. That is, the lower surface 6' is closer to the puzzle plate 5' than the supporting portion 37'. When the kickstand 9' is in the folded state, neither the body portion 4' nor the kickstand 9' will contact a playing surface, and the supporting portion 37' is in contact with the playing surface, allowing the board assembly 30' to rotate under the action of the rotating devices 10' due to the external force. Alternatively, the lower surface may be arranged on either the supporting frame 75' or the kickstand 9'.

FIGS. 35-39 show a jigsaw puzzle board 3000 of a third embodiment of the present invention. The jigsaw puzzle board 3000 comprises a body portion 4", at least one rotating device 10" located below the body portion 4" and connected with the body portion 4". The body portion 4" comprises a puzzle plate 5", a plurality of drawer cavities 70", a plurality of puzzle drawers 8" disposed under the puzzle plate 5" and received in the corresponding drawer cavities 70", a supporting frame 75" supporting an edge of the puzzle plate 5", and a reinforcing member 77" located below the puzzle plate 5" for supporting the puzzle plate 5".

The third embodiment is similar to the first embodiment of the present invention except that: (1) the kickstand 9 is omitted. (2) apart from the drawers 8", the body portion 4" forms a one-piece structure.

The reinforcing member 77" comprises a pair of first reinforcing ribs 771", a plurality of second reinforcing ribs 772", and a pair of third reinforcing ribs 773". At least one of the puzzle plate 5", the supporting frame 75" and the reinforcing member 77" is provided with a connecting block 78" for fixing a corresponding rotating device 10". Each drawer cavity 70" is jointly formed solely by the puzzle plate 5" and the reinforcing member 77". Alternatively, the drawer cavity may be jointly formed by the puzzle plate 5", the supporting frame 75", and the reinforcing member 77". The first reinforcing ribs 771" are arranged at a spacing along a longitudinal direction X", while the second reinforcing ribs 772" are positioned along the longitudinal direction X" on both sides of the first reinforcing ribs 771". One end of each second reinforcing rib 772" is connected to the corresponding first reinforcing rib 771". The third reinforcing ribs 773" are located between the first reinforcing ribs 771", with their two ends respectively connected to the first reinforcing ribs 771". The connecting blocks 78" are arranged on and integrated with the second reinforcing ribs 772", forming a one-piece structure with the puzzle plate 5". Additionally, the connecting block 78" may extend integrally from the puzzle plate 5". Alternatively, the connecting blocks 78" may be arranged on the supporting frame 75", or the connecting blocks 78" may be arranged on both the supporting frame 75" and the reinforcing member 77".

Each rotating device 10" comprises a case 1", a first roller 3" received in the case 1", and a plurality of second rollers 15" received in the case 1" and contacted with the first roller 3". The case 1" comprises a base 11" and a housing 13" mounted on the base 11". The connecting block 78" is provided with a threaded hole 781", and the base 11" is fixed to the connecting block 78" using fasteners 7715" engaged with the threaded hole 781", thereby enabling the rotating device 10" to be fixed to the body portion 4".

The connecting block 78" is in planar contact with the base 11". The puzzle plate 5", the supporting frame 75", the reinforcing member 77", and the connecting block 78" form a one-piece structure. The one-piece structure refers to an integral body formed by the puzzle plate 5", supporting frame 75", reinforcing member 77", and connecting block 78", which possesses good structural integrity, with no splicing transitional areas between the connected components. Each reinforcing member 77" has an overall sheet-like shape and comprises an extending portion 7A integrally extending from the puzzle plate 5" and a holder 7B integrally bending and extending from the extending portion 7A. Each drawer 8" is mounted on the holder 7B and may be pulled in and out along the holder 7B within the drawer cavities 70". The puzzle plate 5", the supporting frame 75", the reinforcing member 77", and the connecting block 78" are all made of plastic material or wood.

The body portion 4" further comprises a plurality of reinforcing portions 74", which extend integrally from the puzzle plate 5". Their height is less than that of the reinforcing member 77' in order to enhance the strength of the puzzle plate 5".

The body portion 4" further comprises a lower surface 6" provided on a lower side 30B" and spaced far away from the puzzle plate 5". The lower surface 6" may be arranged on the reinforcing member 77", the supporting frame 75", or the connecting block 78". In this embodiment, the lower surface 6" is arranged on the holder 7B. Alternatively, the lower surface may be arranged on either the supporting frame 75" or the kickstand 9". The rotating devices 10" have a supporting portion 37" protruded from the lower surface 6" of the body portion 4" and spaced apart from the puzzle plate 5". That is, the lower surface 6" is closer to the puzzle plate 5" than the supporting portion 37". When the kickstand 9" is in the folded state, neither the body portion 4" nor the kickstand 9" will contact a playing surface, and the supporting portion 37" is in contact with the playing surface, allowing the body portion 4" to rotate under the action of the rotating devices 10" due to the external force.

Various technical features of the above-described embodiments may be combined arbitrarily. In order to make the description concise, not all possible combinations of the various technical features are described. However, as long as no contradiction occurs, any combination thereof should be included in the scope of the present invention.

The above-described embodiments show only several embodiments of the present invention, which are described in a more specific and detailed manner, but shall not be interpreted as a limitation of the scope of the present invention. To be noted that, any ordinary skilled person in the art may perform various deformations and improvements without departing from the concept of the present invention, all of which shall fall within the scope of the present invention. Therefore, the scope of the present invention shall be subject to the appended claims.

What is claimed is:

1. A rotating device for moving on a playing surface, comprising:
    a case comprising a receiving space and an opening formed on the case and communicated with the receiving space;
    a first roller received in the receiving space; and
    a second roller completely received in the receiving space and in contact with the first roller to rotate together with the first roller;
    wherein when the first roller and the second roller rotate, at least a part of the first roller passes through the opening to make contact with the playing surface;
    wherein the second roller is blocked by the first roller in the receiving space for preventing the second roller from leaking out of the opening;
    wherein a radius of the first roller is greater than a radius of the second roller; and
    wherein the case comprises an engaging wall and a side wall extending from the engaging wall; the second roller abuts against both the engaging wall and the side wall; the first roller is spaced apart from the engaging wall, and wherein the case comprises a main portion, a fixing portion extending from the main portion and a dome covering on the main portion and connected to the fixing portion; the engaging wall is formed on the main portion; and the opening passes through the dome.

2. The rotating device according to claim 1, wherein the number of second rollers is greater than two, and they are arranged around the first roller.

3. The rotating device according to claim 1, wherein an inner surface of the engaging wall engaged with the second roller is substantially flat.

4. The rotating device according to claim 1, wherein the fixing portion comprises a through-hole, and the case comprises a hook extending from the dome; the hook passes through the through-hole and is engaged with the fixing portion.

5. The rotating device according to claim 1, wherein the case further comprises a surrounding wall extending from the dome towards the side wall to form the receiving space together with the main portion.

6. A jigsaw puzzle board supported on a playing surface for assembling a plurality of puzzle pieces, comprising:
    a board assembly comprising:
        a body portion having a puzzle plate for assembling the puzzle pieces and an extending edge connected to the puzzle plate; and
        a kickstand coupled with the body portion and configured to be in either a folded state or an unfolded state relative to the body portion; and
    at least one rotating device attached to the body portion of the board assembly;
    wherein the extending edge and the kickstand are located on opposite sides of the puzzle plate;
    wherein when the kickstand is in the folded state, the board assembly comprises a lower surface that is distant from the puzzle plate, and at least a part of the rotating device protrudes from the lower surface and contacted with the playing surface, the board assembly is capable of being rotated on the playing place via the rotating device; and
    wherein when the kickstand is in the unfolded state, the body portion and the rotating device are inclined and supported on the playing surface, and the rotating device is in a non-working state.

7. The jigsaw puzzle board according to claim 6, wherein the rotating device comprises a first roller; when the kickstand is in the folded state, at least a part of the first roller protrudes from the lower surface and directly contacted with the playing surface.

8. The jigsaw puzzle board according to claim 7, wherein when the kickstand is unfolded, a bottom of the rotating device near the playing surface is spaced apart from the playing surface.

9. The jigsaw puzzle board according to claim 8, wherein the body portion comprises a longer wall extending along a longitudinal direction; when the kickstand is unfolded, the kickstand cooperates with the longer wall for supporting the body portion on the playing surface.

10. The jigsaw puzzle board according to claim 6, wherein the rotating device further comprises a case comprising a receiving space, an opening formed on the case and communicated with the receiving space, and a second roller completely received in the receiving space; the first roller consists of an inner part received within the receiving space and an outer part that passes through the opening to make contact with the playing surface; the second roller is in contact with the inner part of the first roller.

11. The jigsaw puzzle board according to claim 10, wherein the case comprises a main portion, a fixing portion extending from the main portion, and a dome covering on the main portion and connected to the fixing portion.

12. The jigsaw puzzle board according to claim 11, wherein the body portion comprises a contacting portion; the case comprises a connecting surface mounted on the contacting portion, and both the contacting portion and the connecting surface are substantially flat.

13. The rotating device according to claim 10, wherein the number of second rollers is more than two, and they are arranged around the first roller.

14. The rotating device according to claim 13, wherein a radius of the first roller is greater than a radius of the second roller.

15. A jigsaw puzzle board for placing on a playing place, comprising:
a board assembly comprising:
a body portion having a puzzle plate for assembling the puzzle pieces and an extending edge connected to the puzzle plate; and
a kickstand for supporting the body portion on the playing surface;
at least three rotating devices attached to the body portion and spaced apart from the kickstand;
wherein the extending edge and the kickstand are located on opposite sides of the puzzle plate;
wherein when the kickstand is in a non-working state, the body portion comprises a lower surface that is distant from the puzzle plate, and at least a part of each rotating device protrudes from the lower surface and contacted with the playing surface, the board assembly is capable of being rotated on the playing place via the rotating devices; and
wherein when the kickstand supports the body portion, the body portion and the rotating devices are inclined and supported on the playing surface, and all the rotating devices are in a non-working state.

16. The jigsaw puzzle board according to claim 15, wherein when the kickstand is in a folded state, a plane in which the puzzle plate is located is defined as a projection plane, a projection of the kickstand on the projection plane and projections of the rotating devices on the projection plane do not overlap.

17. The jigsaw puzzle board according to claim 16, wherein when the kickstand is in the folded state, an outer edge of the kickstand forms a folded area; the rotating devices surround the kickstand and are located outside the folded area.

18. The jigsaw puzzle board according to claim 15, wherein the body portion comprises a reinforcing member connected to a lower surface of the puzzle plate, at least one of the rotating devices is attached to the reinforcing member and spaced apart from the puzzle plate.

19. The jigsaw puzzle board according to claim 18, wherein the reinforcing member comprises a pair of first reinforcing ribs spaced apart from each other, the rotating devices are attached to the first reinforcing ribs.

20. The jigsaw puzzle board according to claim 19, wherein the reinforcing member further comprises a pair of second reinforcing ribs interlaced with a corresponding first reinforcing rib.

21. The jigsaw puzzle board according to claim 15, wherein the body portion comprises a supporting frame support an outer peripheral edge of the puzzle plate; at least one of the rotating devices is attached to the supporting frame and spaced apart from the puzzle plate.

22. The jigsaw puzzle board according to claim 15, wherein the rotating devices comprise at least one first roller contacted with the playing surface; when the kickstand is in the folded state, at least a part of the first roller protrudes from the lower surface and contacts the playing surface.

23. The jigsaw puzzle board according to claim 15, wherein the body portion comprises a reinforcing member connected to a lower surface of the puzzle plate, and a projection of at least one rotating device of the at least three rotating devices along the thickness direction of the body portion at least partially overlaps with the reinforcing member.

* * * * *